(12) United States Patent
Zimney et al.

(10) Patent No.: US 11,788,432 B2
(45) Date of Patent: Oct. 17, 2023

(54) TURBOCHARGER LUBRICATION SYSTEM FOR A TWO-STROKE ENGINE

(71) Applicant: Polaris Industries Inc., Medina, MN (US)

(72) Inventors: Derek D. Zimney, Roseau, MN (US); James H. Buchwitz, Roseau, MN (US); Dallas J. Blake, Roseau, MN (US); Alexander M. Hetteen, Roseau, MN (US); Daniel E. Erickson, Labroquerie West (CA); Chad A. Dale, Roseau, MN (US); Darren J. Hedlund, Roseau, MN (US); Derek J. Fitzpatrick, Burnaby (CA); Christopher P. Scremin, Surrey (CA); Reed A. Hanson, Roseau, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 17/145,313

(22) Filed: Jan. 9, 2021

(65) Prior Publication Data
US 2021/0310374 A1    Oct. 7, 2021

Related U.S. Application Data

(60) Provisional application No. 62/960,388, filed on Jan. 13, 2020.

(51) Int. Cl.
*F01D 25/20* (2006.01)
*F01D 25/16* (2006.01)
(Continued)

(52) U.S. Cl.
CPC .......... *F01D 25/20* (2013.01); *F01D 25/162* (2013.01); *F01D 25/243* (2013.01); *F01D 25/28* (2013.01);
(Continued)

(58) Field of Classification Search
CPC ...... F01D 25/162; F01D 25/20; F01D 25/243; F01D 25/28; F02C 6/12; F05D 2220/40;
(Continued)

(56) References Cited

U.S. PATENT DOCUMENTS

| 1,656,629 A | 1/1928 | Gray |
| 1,874,326 A | 8/1932 | Mason |

(Continued)

FOREIGN PATENT DOCUMENTS

| CN | 207648298 U | 7/2018 | |
| CN | 110195644 A * | 9/2019 | ............... F01M 1/16 |

(Continued)

OTHER PUBLICATIONS

Translation JP200276383 Kamijo Sep. 2002.*

(Continued)

*Primary Examiner* — Jesse S Bogue
(74) *Attorney, Agent, or Firm* — Harness, Dickey & Pierce, P.L.C.

(57) ABSTRACT

A system for a vehicle has an oil supply, an engine oil pump comprising a plurality of ports and an engine coupled to the plurality of ports. A turbocharger is coupled to the engine. A turbocharger oil pump is coupled to the oil supply comprising a first port coupled to the turbocharger.

32 Claims, 30 Drawing Sheets

(51) Int. Cl.
*F01D 25/24* (2006.01)
*F01D 25/28* (2006.01)
*F02C 6/12* (2006.01)

(52) U.S. Cl.
CPC .......... *F02C 6/12* (2013.01); *F05D 2220/40* (2013.01); *F05D 2240/50* (2013.01); *F05D 2260/231* (2013.01); *F05D 2260/31* (2013.01); *F05D 2260/606* (2013.01); *F05D 2260/98* (2013.01)

(58) Field of Classification Search
CPC .......... F05D 2240/50; F05D 2260/231; F05D 2260/31; F05D 2260/606; F05D 2260/98
See application file for complete search history.

(56) References Cited

U.S. PATENT DOCUMENTS

| | | | |
|---|---|---|---|
| 2,047,443 A | 7/1936 | Starkweather | |
| 3,190,271 A | 6/1965 | Gudmundsen | |
| 3,614,259 A | 10/1971 | Neff | |
| 3,653,212 A | 4/1972 | Gast et al. | |
| 3,703,937 A | 11/1972 | Tenney | |
| 3,868,822 A | 3/1975 | Keller | |
| 3,870,115 A | 3/1975 | Hase | |
| 4,005,579 A | 2/1977 | Lloyd | |
| 4,047,507 A | 9/1977 | Noguchi et al. | |
| 4,169,354 A | 10/1979 | Woollenweber | |
| 4,235,484 A * | 11/1980 | Owen | F16C 17/10 417/407 |
| 4,254,625 A | 3/1981 | Bergstedt et al. | |
| 4,289,094 A | 9/1981 | Tanahashi | |
| 4,305,351 A | 12/1981 | Staerzl | |
| 4,349,000 A | 9/1982 | Staerzl | |
| 4,468,928 A | 9/1984 | Suzuki | |
| 4,512,152 A | 4/1985 | Asaba | |
| 4,598,549 A | 7/1986 | Kanawyer | |
| 4,628,877 A * | 12/1986 | Sundies | F01M 5/02 123/198 C |
| 5,050,559 A | 9/1991 | Kurosu et al. | |
| 5,051,909 A | 9/1991 | Gomez et al. | |
| 5,085,193 A | 2/1992 | Morikawa | |
| 5,121,604 A | 6/1992 | Berger et al. | |
| 5,191,531 A | 3/1993 | Kurosu et al. | |
| 5,197,426 A | 3/1993 | Frangesch et al. | |
| 5,214,919 A | 6/1993 | Jiewertz et al. | |
| 5,427,083 A | 6/1995 | Ahern | |
| 5,441,030 A | 8/1995 | Satsukawa | |
| 5,579,740 A | 12/1996 | Cotton et al. | |
| 5,586,524 A | 12/1996 | Nonaka et al. | |
| 5,630,395 A | 5/1997 | Katoh et al. | |
| 5,726,397 A | 3/1998 | Mukai et al. | |
| 5,782,214 A | 7/1998 | Nanami et al. | |
| 5,791,304 A | 8/1998 | Taipale | |
| 5,813,374 A | 9/1998 | Chasteen | |
| 5,832,901 A | 11/1998 | Yoshida et al. | |
| 6,073,447 A | 6/2000 | Kawakami et al. | |
| 6,158,214 A | 12/2000 | Kempka et al. | |
| 6,161,384 A | 12/2000 | Reinbold et al. | |
| 6,162,028 A | 12/2000 | Rembold | |
| 6,170,463 B1 | 1/2001 | Koerner | |
| 6,209,530 B1 | 4/2001 | Faletti et al. | |
| 6,435,169 B1 | 8/2002 | Vogt | |
| 6,443,123 B1 | 9/2002 | Aoki et al. | |
| 6,658,849 B1 | 12/2003 | Hallman et al. | |
| 6,739,579 B1 | 5/2004 | Rim | |
| 6,745,568 B1 * | 6/2004 | Squires | F02B 37/186 184/6.16 |
| 6,830,121 B1 | 12/2004 | Johnson | |
| 6,942,052 B1 | 9/2005 | Blakely | |
| 6,976,359 B2 | 12/2005 | Hastings et al. | |
| 6,983,596 B2 | 1/2006 | Frankenstein et al. | |
| 7,017,706 B2 | 3/2006 | Brown et al. | |
| 7,621,127 B2 | 11/2009 | Robinson | |
| 7,794,213 B2 | 9/2010 | Gaude et al. | |
| 8,128,356 B2 | 3/2012 | Higashimori | |
| 8,220,262 B2 | 7/2012 | Robinson | |
| 8,474,789 B2 | 7/2013 | Shimada et al. | |
| 8,483,932 B2 | 7/2013 | Pursifull | |
| 8,490,605 B2 | 7/2013 | Gracner et al. | |
| 8,528,327 B2 | 9/2013 | Bucknell et al. | |
| 8,641,363 B2 | 2/2014 | Love et al. | |
| 8,671,683 B2 | 3/2014 | Lilly | |
| 9,188,048 B2 | 11/2015 | Bedard | |
| 9,322,323 B2 | 4/2016 | Panciroli | |
| 9,630,611 B1 | 4/2017 | Dufford | |
| 9,670,833 B2 | 6/2017 | Klipfel et al. | |
| 9,719,469 B1 | 8/2017 | Pelfrey et al. | |
| 10,989,124 B2 | 4/2021 | Yamaguchi et al. | |
| 11,131,235 B2 | 9/2021 | Buchwitz et al. | |
| 11,255,231 B2 * | 2/2022 | Fuhrman | F01M 1/02 |
| 2001/0023683 A1 | 9/2001 | Nakamura et al. | |
| 2001/0032601 A1 | 10/2001 | Galka et al. | |
| 2001/0047656 A1 | 12/2001 | Maddock et al. | |
| 2002/0078934 A1 | 6/2002 | Hohkita et al. | |
| 2002/0124817 A1 | 9/2002 | Abei | |
| 2003/0029663 A1 | 2/2003 | Etou | |
| 2003/0236611 A1 | 12/2003 | James et al. | |
| 2005/0039722 A1 | 2/2005 | Montgomery et al. | |
| 2006/0175107 A1 | 8/2006 | Etou | |
| 2006/0185632 A1 | 8/2006 | Mavinahally | |
| 2007/0062188 A1 | 3/2007 | Fry et al. | |
| 2007/0113829 A1 | 5/2007 | Allen | |
| 2007/0234997 A1 * | 10/2007 | Prenger | F01M 11/02 123/196 S |
| 2007/0289302 A1 | 12/2007 | Funke et al. | |
| 2008/0060617 A1 | 3/2008 | Adachi et al. | |
| 2008/0250786 A1 | 10/2008 | Robinson | |
| 2008/0264380 A1 | 10/2008 | Kang et al. | |
| 2008/0276906 A1 | 11/2008 | Thomas | |
| 2009/0276141 A1 | 11/2009 | Surnilla et al. | |
| 2010/0024786 A1 | 2/2010 | Robinson | |
| 2010/0036585 A1 | 2/2010 | Scharfenberg | |
| 2010/0041287 A1 | 2/2010 | Woods et al. | |
| 2010/0114454 A1 * | 5/2010 | French | F02B 39/14 123/196 S |
| 2010/0213000 A1 | 8/2010 | Inoue | |
| 2010/0243343 A1 | 9/2010 | Rasmussen | |
| 2010/0313418 A1 | 12/2010 | St. Mary | |
| 2011/0061637 A1 | 3/2011 | Mavinahally et al. | |
| 2011/0093182 A1 | 4/2011 | Weber et al. | |
| 2011/0186013 A1 | 8/2011 | Sasaki | |
| 2011/0296835 A1 | 12/2011 | Ebisu | |
| 2012/0018468 A1 | 1/2012 | Dunican, Sr. | |
| 2012/0060494 A1 | 3/2012 | Sato et al. | |
| 2012/0181468 A1 | 7/2012 | Telep et al. | |
| 2012/0255379 A1 | 10/2012 | Lim et al. | |
| 2012/0269620 A1 * | 10/2012 | Boening | F01D 25/24 415/203 |
| 2012/0282078 A1 * | 11/2012 | Marsal | F01D 25/164 415/1 |
| 2012/0285177 A1 | 11/2012 | Swenson et al. | |
| 2012/0285427 A1 | 11/2012 | Hayman et al. | |
| 2012/0316756 A1 | 12/2012 | Tsuyuki | |
| 2013/0111900 A1 | 5/2013 | Hagner et al. | |
| 2014/0158089 A1 | 6/2014 | Glugla et al. | |
| 2014/0360178 A1 | 12/2014 | Wang | |
| 2014/0366815 A1 | 12/2014 | Lu | |
| 2015/0167593 A1 | 6/2015 | Kim et al. | |
| 2015/0240707 A1 | 8/2015 | Wang et al. | |
| 2016/0010541 A1 | 1/2016 | Wang et al. | |
| 2016/0040566 A1 | 2/2016 | Barole et al. | |
| 2016/0061139 A1 | 3/2016 | Imai et al. | |
| 2016/0341116 A1 * | 11/2016 | French | F01D 11/003 |
| 2017/0016407 A1 | 1/2017 | Whitney et al. | |
| 2017/0022927 A1 | 1/2017 | Sanborn et al. | |
| 2017/0051684 A1 | 2/2017 | Lahti et al. | |
| 2017/0058760 A1 | 3/2017 | Shor | |
| 2017/0152794 A1 | 6/2017 | Patil et al. | |
| 2017/0276067 A1 | 9/2017 | Hand, III et al. | |
| 2017/0292631 A1 | 10/2017 | Muraoka | |
| 2018/0003103 A1 | 1/2018 | Kawamura et al. | |
| 2018/0051622 A1 | 2/2018 | Liu et al. | |

(56) References Cited

U.S. PATENT DOCUMENTS

| | | | |
|---|---|---|---|
| 2018/0283270 A1* | 10/2018 | Niwa | F02B 39/14 |
| 2018/0347455 A1* | 12/2018 | Noda | F16C 33/66 |
| 2019/0055862 A1* | 2/2019 | Fuhrman | F01P 3/20 |
| 2019/0063304 A1 | 2/2019 | Lefebvre et al. | |
| 2019/0136754 A1 | 5/2019 | Brin et al. | |
| 2019/0136818 A1 | 5/2019 | Blake et al. | |
| 2019/0178197 A1 | 6/2019 | Okamura | |
| 2019/0323510 A1* | 10/2019 | Serbes | F04D 29/4206 |
| 2020/0182139 A1 | 6/2020 | Buchwitz et al. | |
| 2021/0040907 A1 | 2/2021 | Christensen et al. | |
| 2021/0078674 A1* | 3/2021 | Schuehmacher | F02B 37/02 |
| 2021/0131366 A1 | 5/2021 | Blake et al. | |

FOREIGN PATENT DOCUMENTS

| | | | | |
|---|---|---|---|---|
| JP | H05180056 A | | 7/1993 | |
| JP | 2000248920 A | | 9/2000 | |
| JP | 2002276383 A | * | 9/2002 | |
| JP | 2008223626 A | * | 9/2008 | |
| JP | 4661612 B2 | | 3/2011 | |
| JP | 5001918 B2 | | 8/2012 | |
| KR | 20010059144 A | | 7/2001 | |
| RU | 2706329 C1 | * | 11/2019 | F01M 1/02 |
| SE | 535726 C2 | | 11/2012 | |

OTHER PUBLICATIONS

"Garrett by Honeywell", 2016, Honeywell, vol. 6 (Year: 2016).
Office Action dated Mar. 9, 2021 in counterpart Canadian App. No. 3,063, 162.
Office Action issued in corresponding Canadian Application No. 3,063,162 dated Aug. 20, 2021 (4 pages).
Office Action issued in corresponding Canadian Application No. 3,063,162 dated Sep. 16, 2021 (6 pages).
Office Action issued in corresponding Canadian Application No. 3,063,164 dated Feb. 14, 2022.
Canadian Office Action dated Apr. 6, 2022 in corresponding Canadian Application No. 3,063,132 (5 pages).
Canadian Office Action dated Nov. 17, 2022 in corresponding Canadian Application No. 3,105,244.

* cited by examiner

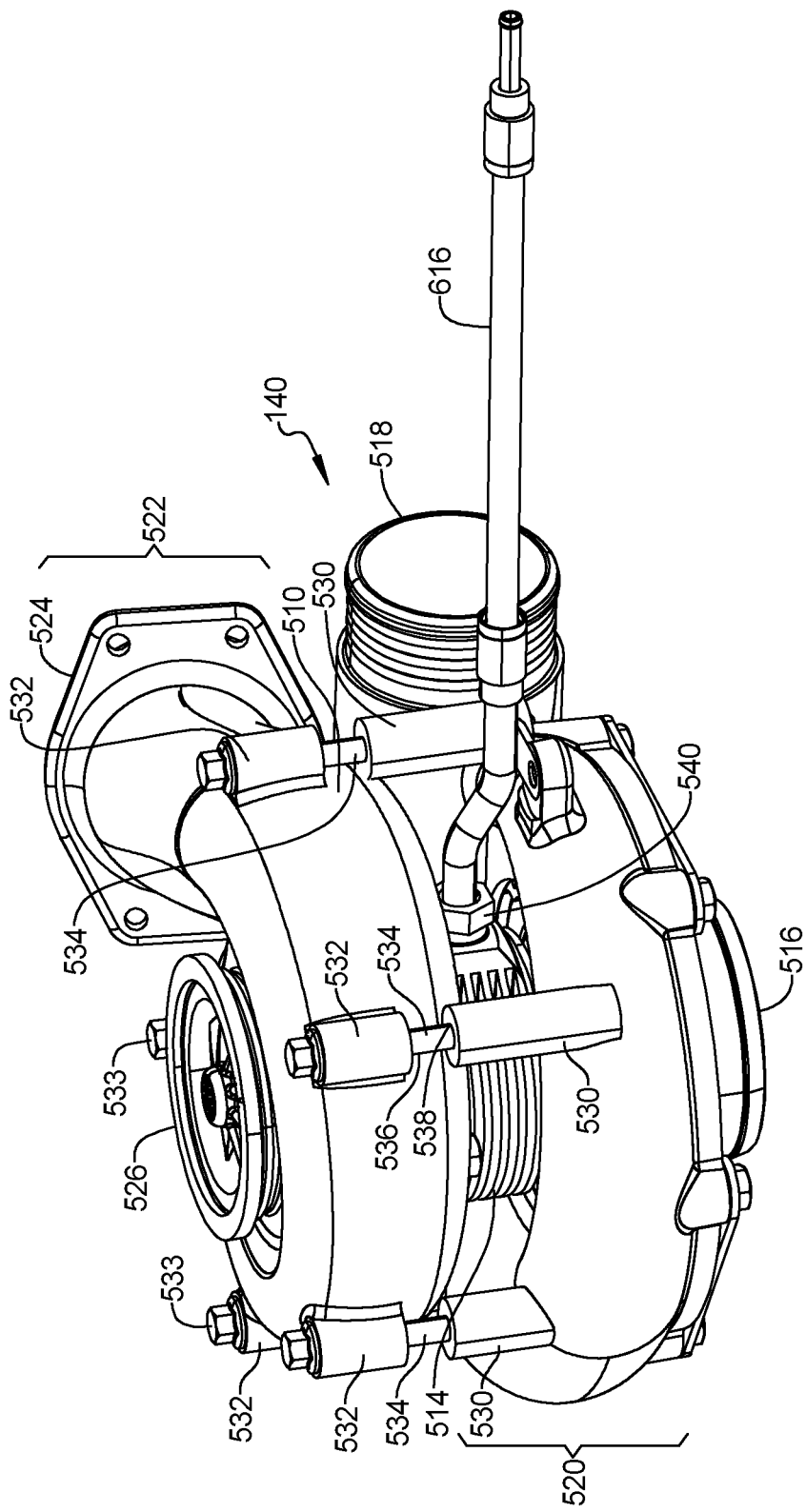

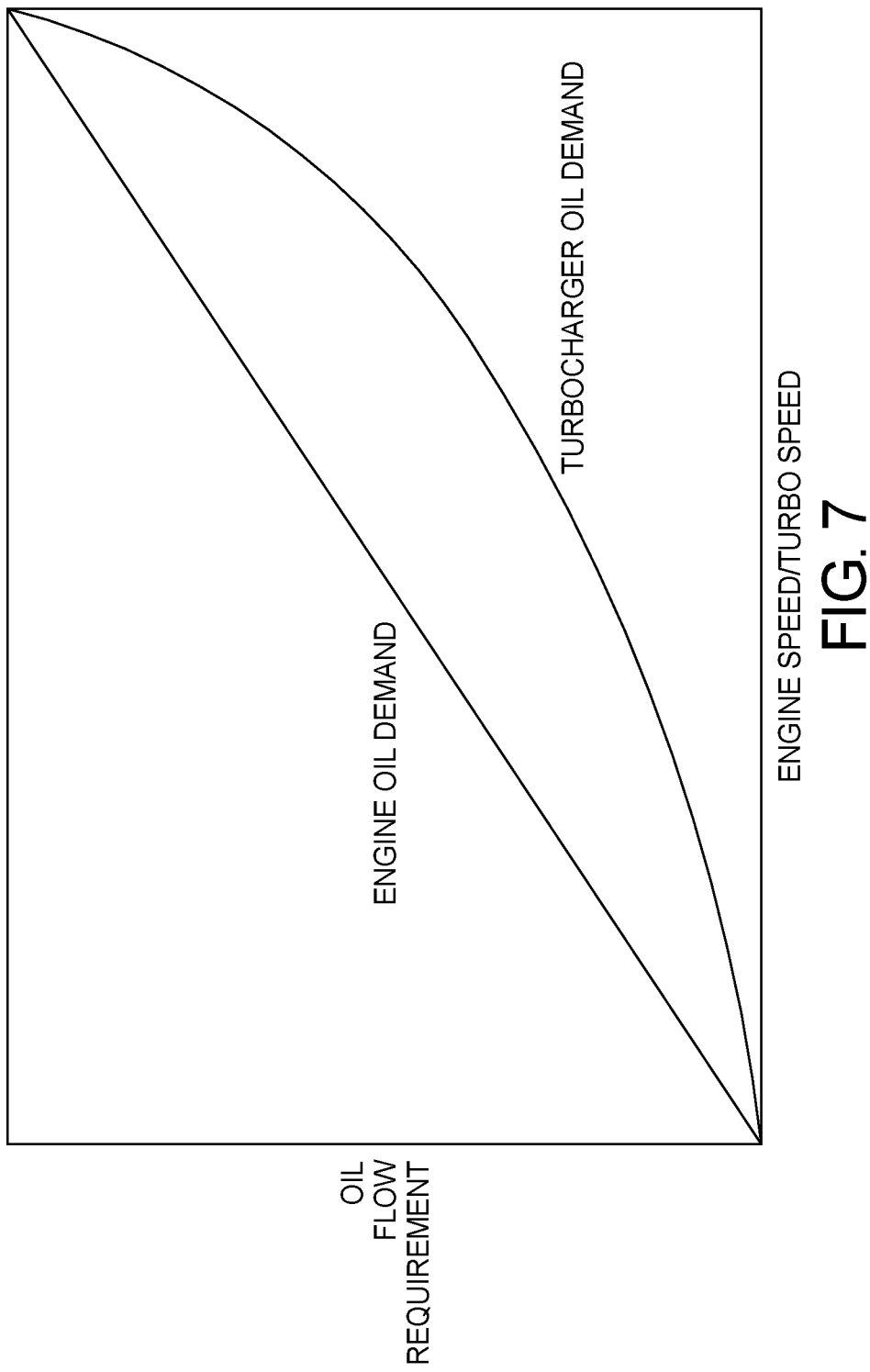

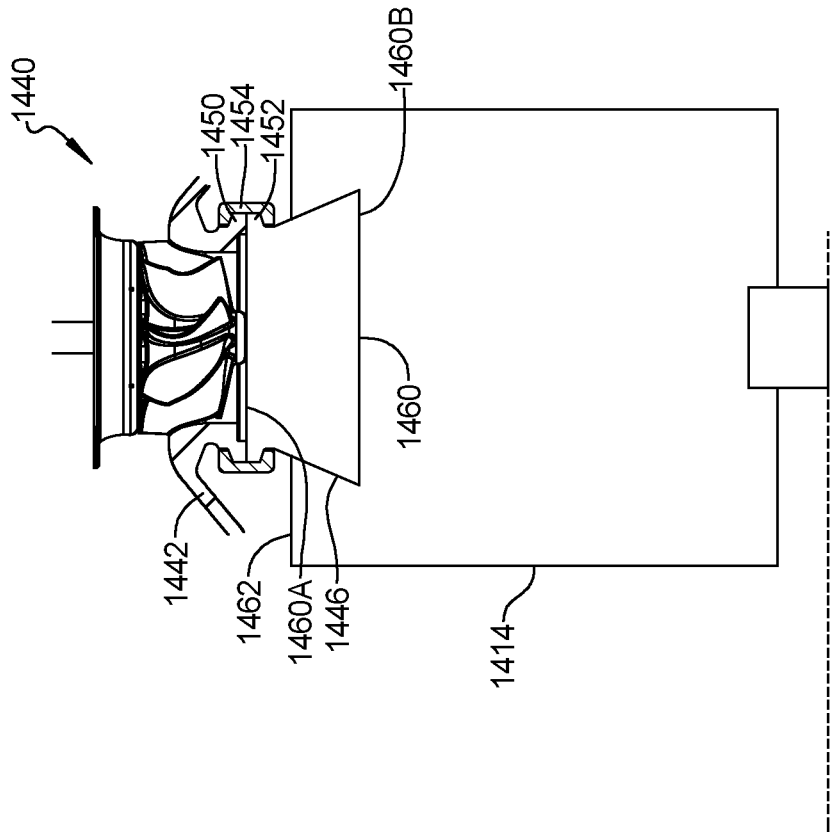
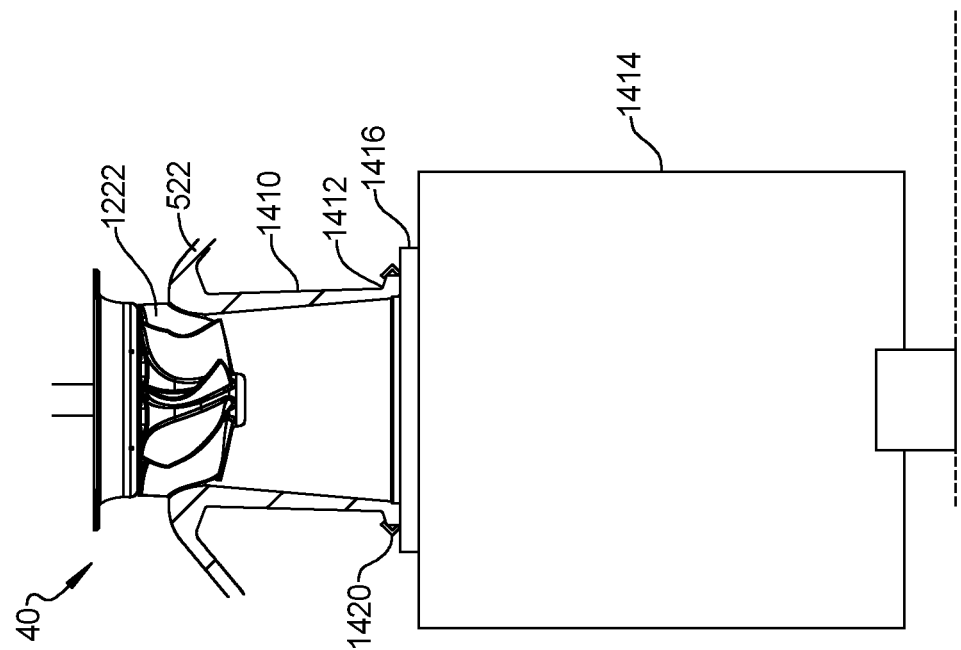
FIG. 14B
FIG. 14A

TURBOCHARGER LUBRICATION SYSTEM FOR A TWO-STROKE ENGINE

CROSS-REFERENCE TO RELATED APPLICATIONS

This application is a non-provisional of provisional application 62/960,388 filed on Jan. 13, 2020, the disclosure of which is incorporated by reference. This application incorporates the disclosures of U.S. application Ser. No. 16/691,995 filed Nov. 22, 2019, U.S. application Ser. No. 16/696,198 filed Nov. 26, 2019, U.S. application Ser. No. 16/691,097 filed Nov. 21, 2019, U.S. application Ser. No. 16/692,336 filed Nov. 22, 2019, U.S. application Ser. No. 16/692,470 filed Nov. 22, 2019, U.S. application Ser. No. 16/692,628 filed Nov. 22, 2019, U.S. application Ser. No. 16/692,724 filed Nov. 22, 2019, U.S. application Ser. No. 16/692,795 filed Nov. 22, 2019. The entire disclosures of the above applications are incorporated herein by reference.

FIELD

The present disclosure relates to a vehicle engine and, more particularly, to a method of lubricating the engine and turbocharger.

BACKGROUND

This section provides background information related to the present disclosure which is not necessarily prior art.

A vehicle, such as a snowmobile, generally includes an engine assembly. The engine assembly is operated with the use of fuel to generate power to drive the vehicle. The power to drive a snowmobile is generally generated by a combustion engine that drives pistons and a connected crankshaft. Two-stroke snowmobile engines are highly tuned, and high specific power output engines that operate under a wide variety of conditions.

In order to achieve high performance, snowmobile manufacturers are always looking for ways to reduce the amount of weight and increase the power. One way to increase the power is to provide a turbocharger for the engine. The engines also require oil which is provided to the engine by an oil pump. In many Polaris vehicles, a Polaris two-stroke engine oil pump is solenoid driven. Turbochargers also require lubrication. However, the engine oil pump provides oil at a rate that exceeds the amount needed for a turbocharger. Providing an extra oil pump for a turbocharger is disadvantageous in that the extra oil pump increases the weight of the snowmobile.

SUMMARY

This section provides a general summary of the disclosures, and is not a comprehensive disclosure of its full scope or all of its features.

In a first aspect of the disclosure, a system for a vehicle has an oil supply, an engine oil pump comprising a plurality of ports and an engine coupled to the plurality of ports. A turbocharger is fluidically coupled to the engine. A turbocharger oil pump is coupled to the oil supply and comprises a first port coupled to the turbocharger.

In another aspect of the disclosure, a method of operating a turbocharger includes communicating oil from an oil supply to an engine from an engine oil pump, communicating oil from an oil supply to a turbocharger oil pump, said turbocharger oil pump separate from the engine oil pump and communicating oil to the turbocharger through a first port of the turbocharger oil pump.

In yet another aspect of the disclosure, a system including a turbocharger includes a turbine housing and a muffler comprising an outer wall comprising a first wall and a conical wall extending within and outside of the muffler. A turbocharger including a turbocharger housing comprising a compressor housing, a turbine housing, and a bearing portion disposed between the turbine housing and the compressor housing. The turbocharger housing includes a shaft having a vertical axis of rotation. The compressor housing is disposed above the turbine housing. A compressor bearing is disposed between the shaft and the bearing housing, an inner bearing spacer and an outer bearing spacer. A turbine bearing is disposed between the shaft and the bearing housing. A squeeze film damper is disposed between the bearing housing and the outer bearing spacer. An oil feed is disposed within the turbocharger housing. An oil path is fluidically coupled to the oil feed communicating oil to the compressor housing, the turbine bearing and the squeeze film damper. The oil path fluidically couples oil from the compressor bearing to the turbine bearing.

Further areas of applicability will become apparent from the description provided herein. The description and specific examples in this summary are intended for purposes of illustration only and are not intended to limit the scope of the present disclosure.

DRAWINGS

FIG. 1 is a perspective view of a snowmobile.
FIG. 2 is an exploded view of the snowmobile of FIG. 1.
FIGS. 2A and 2B are enlarged exploded views of FIG. 2.
FIG. 3 is a block diagram the engine of FIG. 2.
FIG. 4 is an exploded view of the engine of FIG. 3.
FIG. 5A is a perspective view of a turbocharger according to the present disclosure.
FIG. 5B is a bottom view of a turbocharger according to the present disclosure.
FIG. 5C is a perspective view of a bearing housing of the turbocharger having a check valve therein.
FIG. 6 is a schematic view of an oil supply system for a turbocharger according to a first example of the present disclosure.
FIG. 7 is a plot of oil flow requirement versus engine speed/turbo speed.
FIG. 8A is a schematic view of a second example of a lubricant circuit according to the present disclosure.
FIG. 8B is a schematic view of a third example of a lubricant circuit according to a second example of the present disclosure.
FIG. 9 is a schematic view of a fourth example of a lubricant circuit according to the present disclosure.
FIG. 10 is a schematic view of a system for lubricating a turbocharger according to the present disclosure.
FIG. 11A is block diagrammatic view of a system having a turbocharger oil pump within the oil tank for lubricating the turbocharger with a separate engine pump.
FIG. 11B is a schematic view of a turbo oil pump external to the oil tank including an engine oil pump.
FIG. 11C is a schematic view of a mounting for a turbocharger oil pump on an oil tank.
FIG. 11D is a perspective view of the mount of FIG. 11C.
FIG. 12A is a cross-sectional view of a turbocharger having a first system for communicating oil to components within the turbocharger.

FIG. 14A is a side view of a turbocharger mounted to a muffler according to the prior art.

FIG. 14B is a side view of a turbocharger mounted to a muffler according to the present disclosure.

DETAILED DESCRIPTION

Examples will now be described more fully with reference to the accompanying drawings. Although the following description includes several examples of a snowmobile application, it is understood that the features herein may be applied to any appropriate vehicle, such as motorcycles, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings. The word oil is used to refer to a lubricant herein and thus the word may be interchanged. The lubricant or oil may be synthetic or refined from naturally occurring petroleum.

Figure 1:
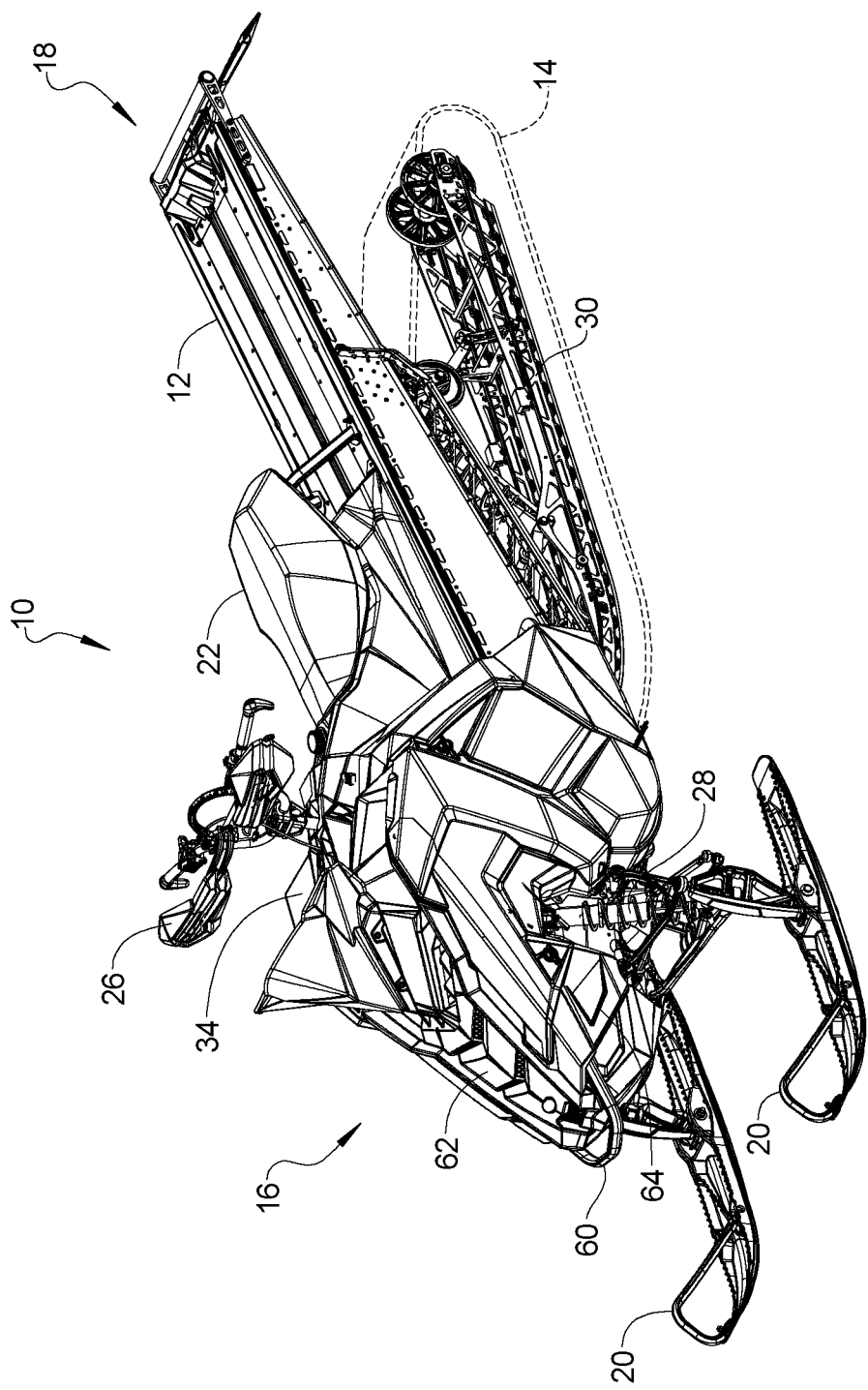
Figure 2:
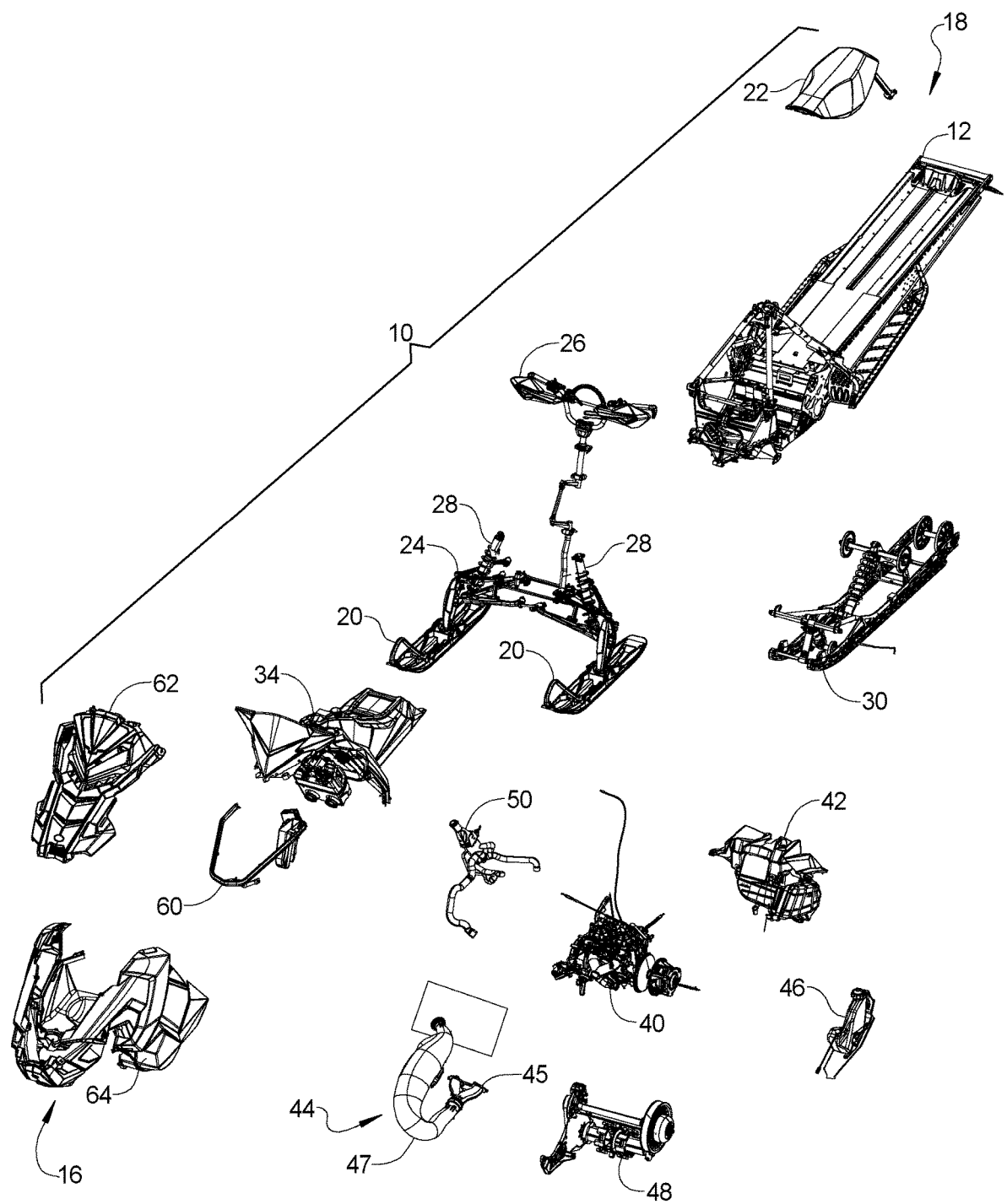
Figure 2A:
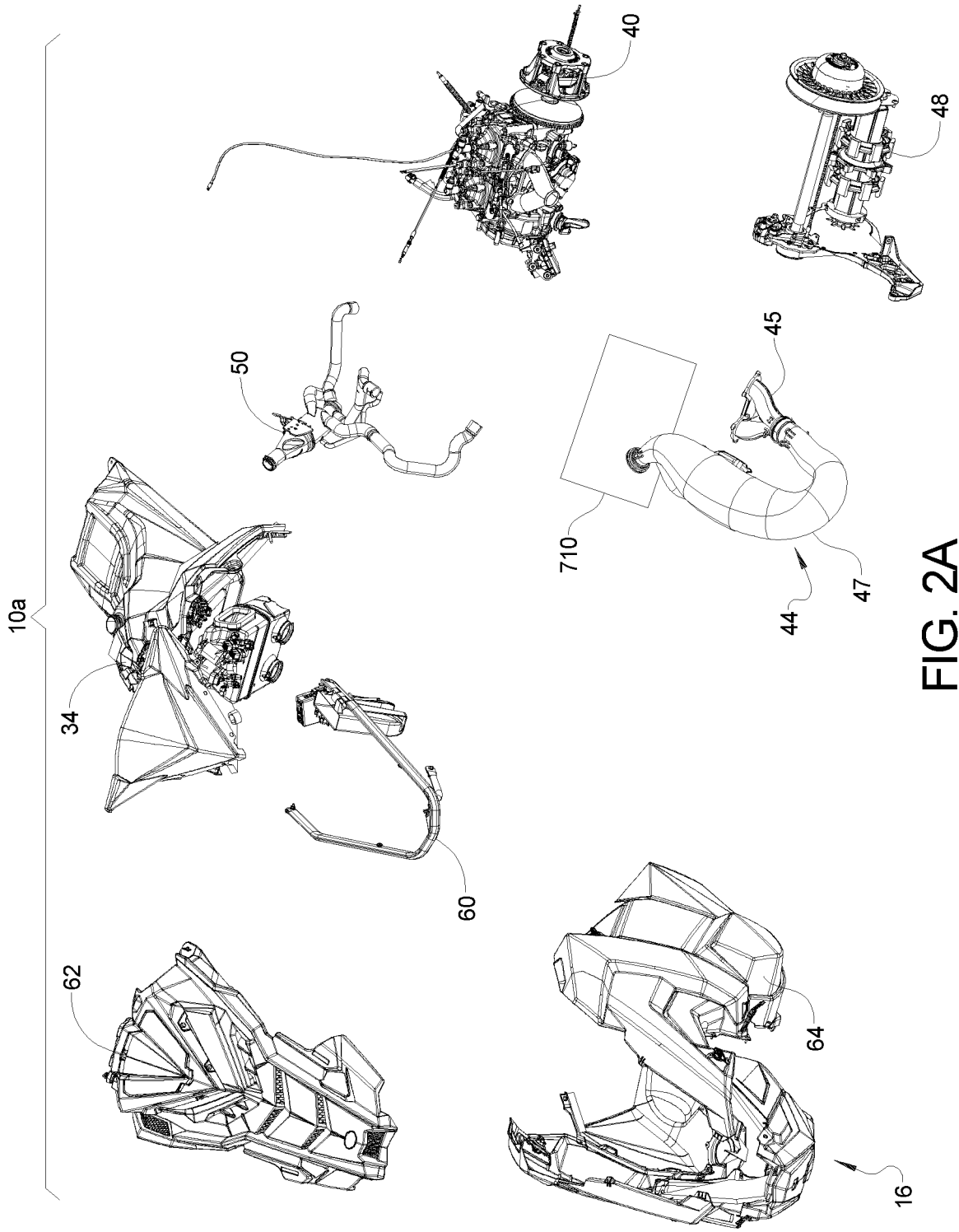
Figure 2B:
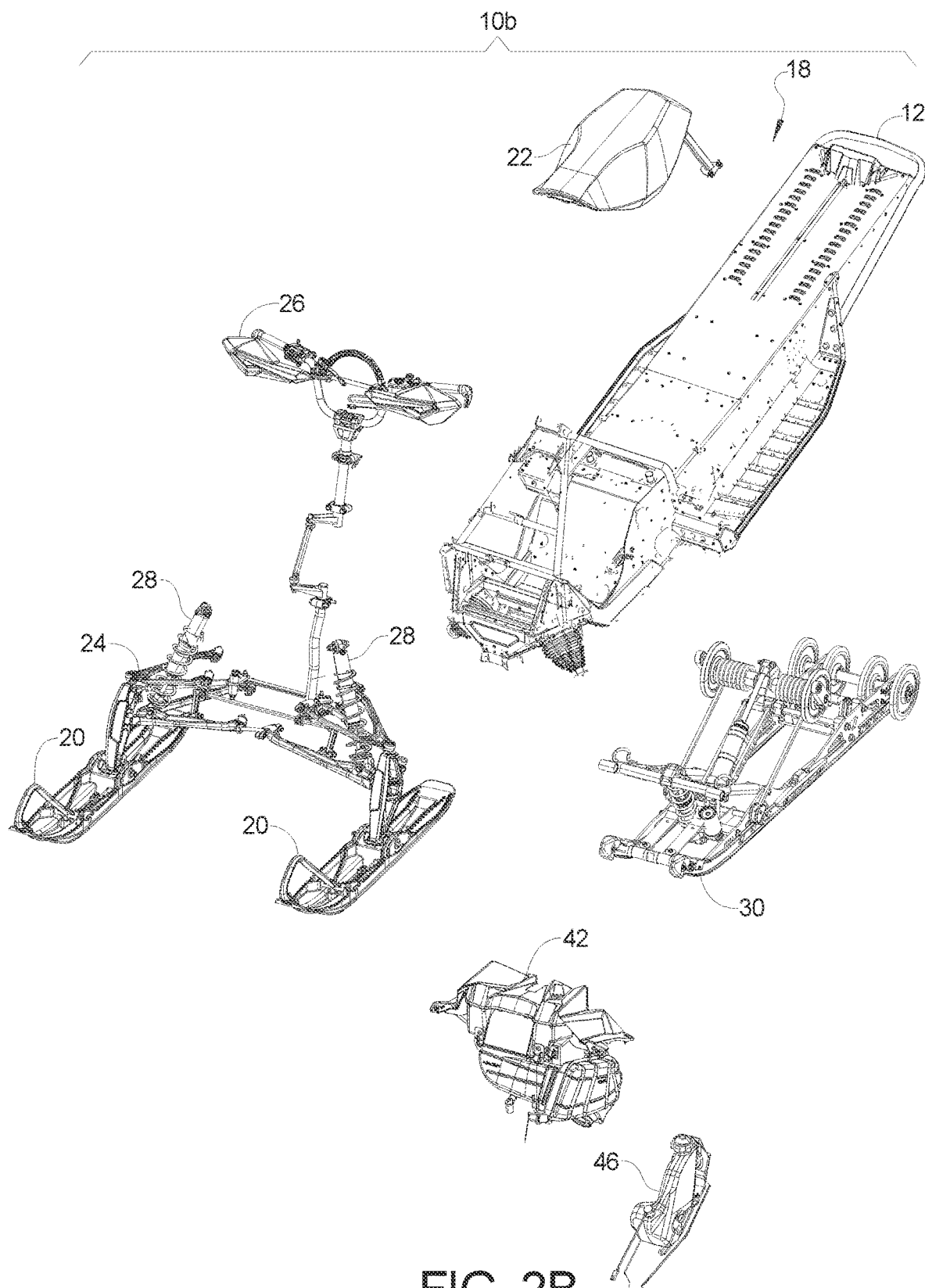

Referring now to FIGS. 1 and 2, one example of an exemplary snowmobile 10 is shown. Snowmobile 10 includes a chassis 12, an endless belt assembly 14, and a pair of front skis 20. Snowmobile 10 also includes a front-end 16 and a rear-end 18.

The snowmobile 10 also includes a seat assembly 22 that is coupled to the chassis assembly 12. A front suspension assembly 24 is also coupled to the chassis assembly 12. The front suspension assembly 24 may include handlebars 26 for steering, shock absorbers 28 and the skis 20. A rear suspension assembly 30 is also coupled to the chassis assembly 12. The rear suspension assembly 30 may be used to support the endless belt 14 for propelling the vehicle. An electrical console assembly 34 is also coupled to the chassis assembly 12. The electrical console assembly 34 may include various components for displaying engine conditions (i.e., gauges) and for electrically controlling the snowmobile 10.

The snowmobile 10 also includes an engine assembly 40. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44. The exhaust assembly 44 includes the exhaust manifold 45 and tuned pipe 47. An oil tank assembly 46 is used for providing oil to the engine for lubrication where it is mixed directly with fuel. In other systems oil and fuel may be mixed in the intake assembly. A drivetrain assembly 48 is used for converting the rotating crankshaft assembly from the engine assembly 40 into a potential force to use the endless belt 14 and thus the snowmobile 10. The engine assembly 40 is also coupled to a cooling assembly 50.

The chassis assembly 12 may also include a bumper assembly 60, a hood assembly 62 and a nose pan assembly 64. The hood assembly 62 is movable to allow access to the engine assembly 40 and its associated components.

Figure 3:
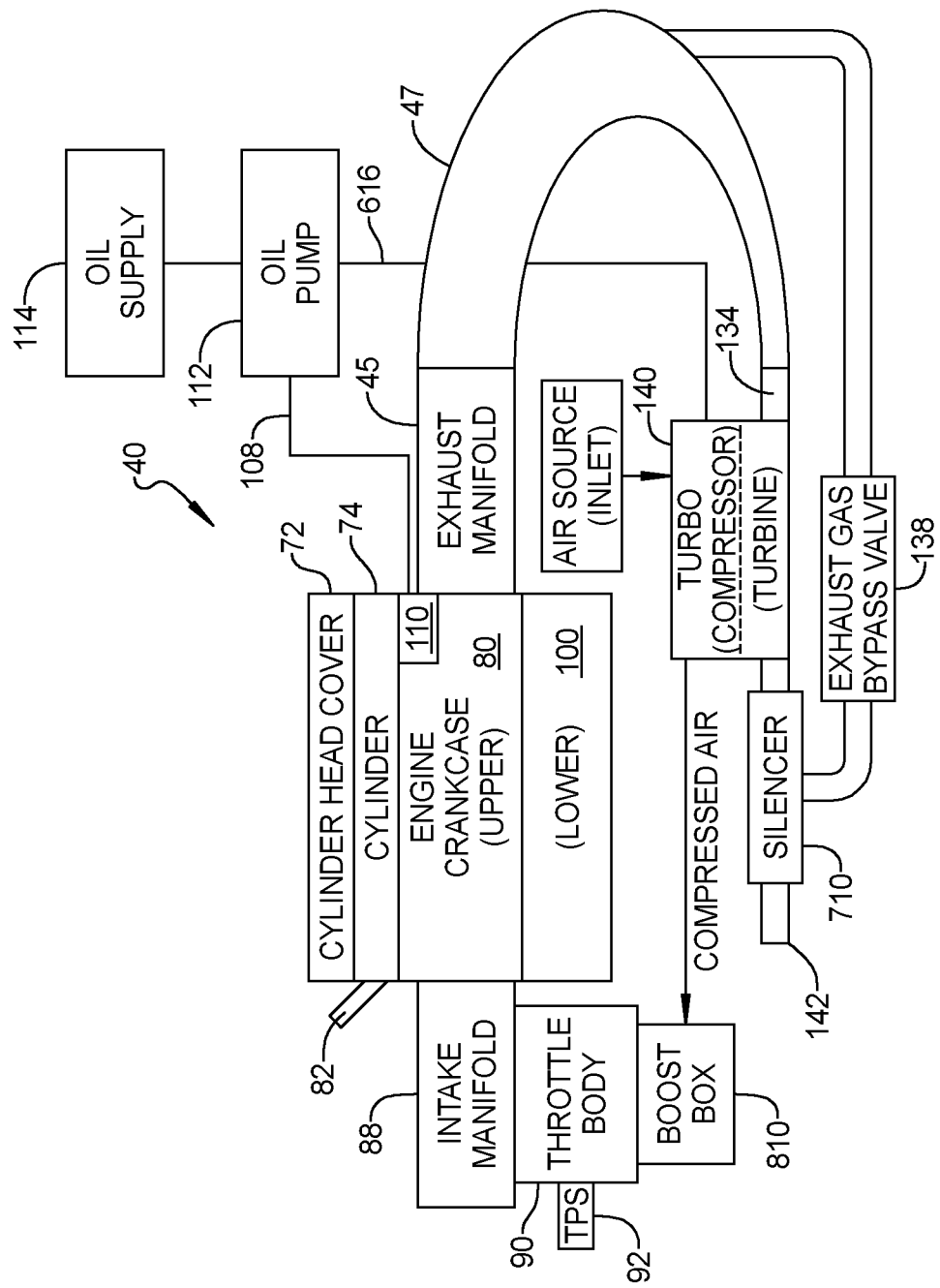
Figure 4:
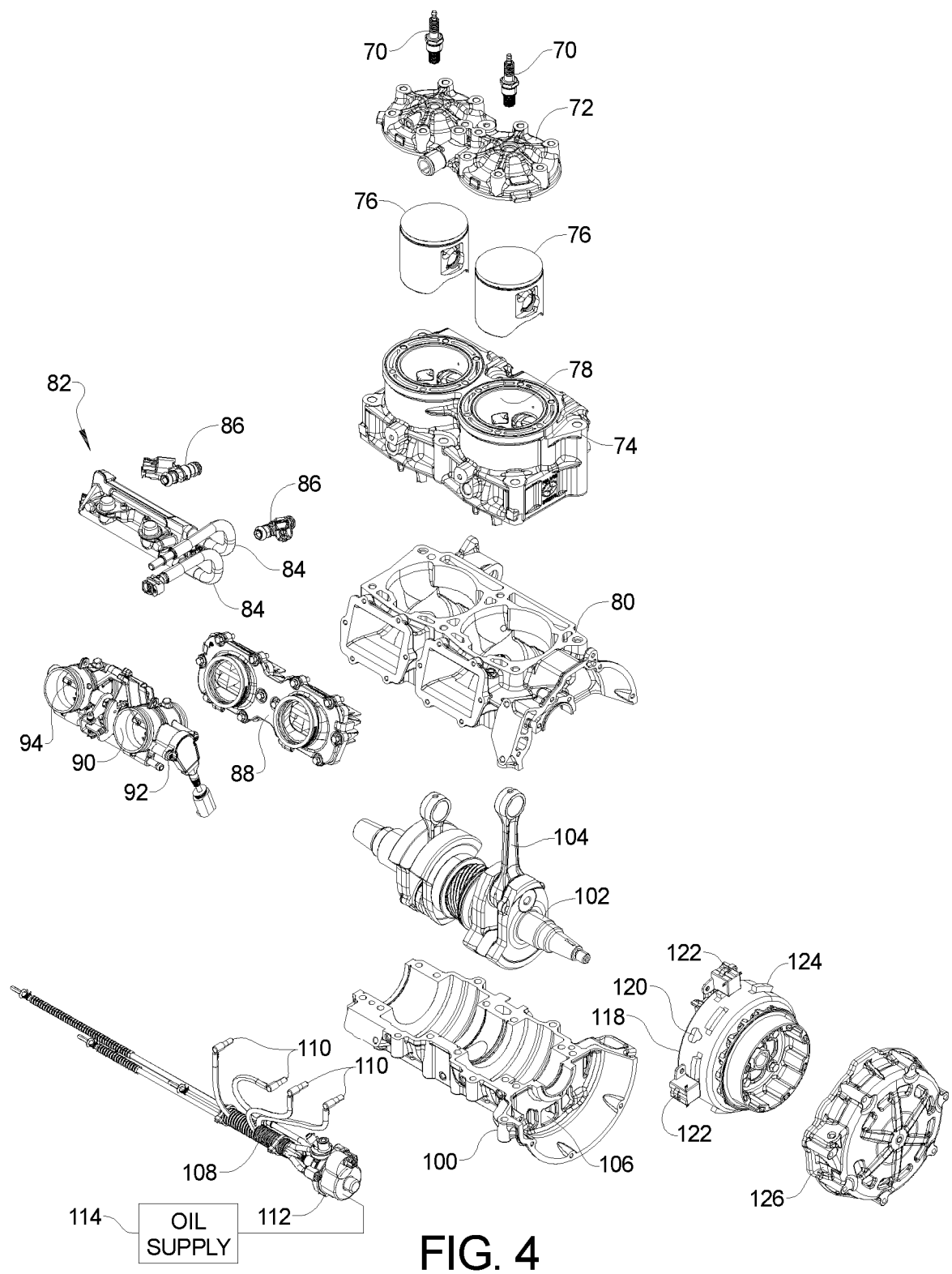

Referring now to FIGS. 3 and 4, the engine assembly 40 is illustrated in further detail. The engine assembly 40 is a two-stroke engine that includes the exhaust assembly 44 that includes an exhaust manifold 45, tuned pipe 47 and exhaust silencer 710.

The engine assembly 40 may include spark plugs 70 which are coupled to a one-piece cylinder head cover 72. The cylinder head cover 72 is coupled to the cylinder 74 with twelve bolts which is used for housing the pistons 76 to form a combustion chamber 78 therein. The cylinder 74 is mounted to the engine upper crankcase 80.

The fuel system 82 that forms part of the engine assembly 40, includes fuel lines 84 and fuel injectors 86. The fuel lines 84 provide fuel to the fuel injectors 86 which inject fuel, in this case, into a port in the cylinder adjacent to the pistons 76. In other cases, an injection may take place in the throttle body, adjacent to the piston or into a boost box. An intake manifold 88 is coupled to the engine upper crankcase 80. The intake manifold 88 is in fluidic communication with the throttle body 90. Air for the combustion processes is admitted into the engine through the throttle body 90 which may be controlled directly through the use of an accelerator pedal or hand operated lever or switch. A throttle position sensor 92 is coupled to the throttle to provide a throttle position signal corresponding to the position of a throttle valve of throttle plate 94 to an engine controller discussed further herein.

The engine upper crankcase 80 is coupled to lower crankcase 100 and forms a cavity for housing the crankshaft 102. The crankshaft 102 has connecting rods 104 which are ultimately coupled to the pistons 76. The movement of the pistons 76 within the combustion chamber 78 causes a rotational movement at the crankshaft 102 by way of the connecting rods 104. The crankcase may have openings or vents 106 therethrough.

The system is lubricated using oil lines 108 which are coupled to the oil injectors 110 and an oil pump 112. An oil supply 114 supplies oil to the oil pump and ultimately to the engine assembly 40 and the turbocharger 140 as described in further detail below.

The crankshaft 102 is coupled to a generator flywheel 118 and having a stator 120 therein. The flywheel 118 has crankshaft position sensors 122 that aid in determining the positioning of the crankshaft 102. The crankshaft position sensors 122 are aligned with the teeth 124 and are used when starting the engine, as well as being used to time the operation of the injection of fuel during the combustion process. A stator cover 126 covers the stator 120 and flywheel 118.

Discussed below are various features of the engine assembly 40 used in the snowmobile 10. Each of the features relate to the noted section headings set forth below. It should be noted that each of these features can be employed either individually or in any combination with the engine assembly 40. Moreover, the features discussed below will utilize the reference numerals identified above, when appropriate, or other corresponding reference numerals as needed. Again, as noted above, while the engine assembly 40 is a two-stroke engine that can be used with the snowmobile 10, the engine assembly 40 can be used with any appropriate vehicles and the features discussed below may be applied to four-stroke engine assemblies as well.

The engine assembly 40 also includes an exhaust manifold 45 that directs the exhaust gases from the engine. The exhaust manifold 45 is in fluid communication with a tuned pipe 47. The tuned pipe 47 is specifically shaped to improve the performance and provide the desired feedback to the engine assembly 40. The tuned pipe 47 is in communication with a stinger 134. The tuned pipe 47 has a bypass pipe 136 coupled thereto. The bypass pipe 136 has an exhaust gas bypass valve 138 used for bypassing some or all of the exhaust gases from being directed to a turbocharger 140. Details of the turbocharger 140 are set forth in the following figures.

Figure 5B:
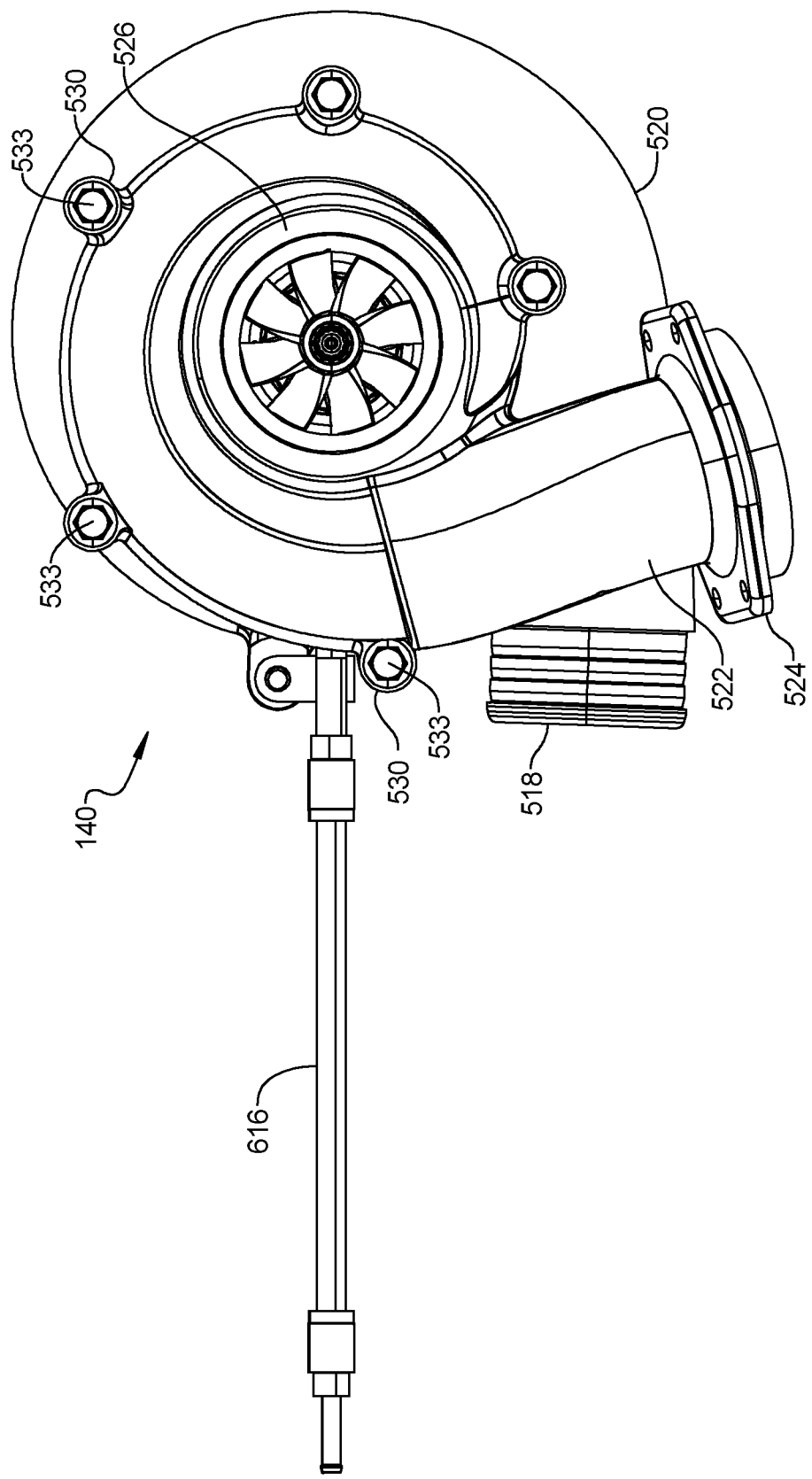

Referring now to FIGS. 5A-5B, the turbocharger 140 includes a turbine portion 510 and a pump or compressor portion 512. The turbine portion 510 and the compressor portion 512 have a common shaft (not shown) that extends through a bearing housing 514 therebetween. That is, the rotational movement within the turbine portion 510 caused from the exhaust gases rotate a turbine wheel which in turn rotates the shaft which, in turn, rotates a compressor wheel.

The compressor portion 512 includes an inlet 516 and an outlet 518. Movement of the compressor wheel causes inlet air from the inlet 516 to be pressurized and output through the outlet 518 of the compressor housing 520.

The turbine portion 510 includes a turbine wheel within turbine housing 522. The turbine housing 522 includes a turbine inlet 524 and a turbine outlet 526. The inlet 524 receives exhaust gas through the tuned pipe 47 and the stinger 134 as illustrated above.

The compressor housing 520 has a plurality of compressor fastener receivers 530 extending therefrom. The compressor fastener receivers 530 are preferably integrally formed with the compressor housing 520. The turbine housing 522 has a plurality of turbine fastener receivers 532 coupled thereto. The compressor fastener receivers 530 align with the turbine fastener receivers 532. In this example, an asymmetric pattern is formed between the compressor fastener receivers 530 and the turbine fastener receivers 532. Because limited space is often found in engine compartments, fasteners 534 that extend between the compressor fastener receivers 530 and the turbine fastener receivers 532 are more easily reachable for disassembly. In prior systems, the bearing housing 514 and the turbine portion 510 was separately fastened from the bearing housing 514 and the compressor portion 512. That is, separate sets of fasteners were used to couple the bearing housing 514 to the turbine portion 510 and the compressor portion 512. Because of the asymmetric pattern, misalignment is thus avoided.

The fasteners 534 may be threaded fasteners such as bolts. One of the compressor fastener receivers 530 or the turbine fastener receivers 532 may be threaded correspondingly. However, both the compressor fastener receivers 530 and the turbine fastener receivers may be unthreaded bores and a nut may be used to fasten the fastener 534 to the compressor fastener receiver 530 and the turbine fastener receiver 532. In this example, a head 533 is disposed on one side of the turbine fastener receivers 532. A shaft 536 passes through the turbine fastener receivers 532. A threaded portion 538 of the fastener 534 is received within the compressor fastener receiver 530. In the present example five fasteners 534 and therefore five compressor fastener receivers 530 and five turbine fastener receivers 532 are used.

The bearing housing 514 includes an oil inlet 540. The oil inlet 540 receives oil from an oil supply. The oil that is received through the oil inlet 540 is used to lubricate the turbocharger 140 and more specifically the bearings 542 of the turbocharger 140. In other examples an oil outlet, a coolant inlet and coolant outlet may be disposed on the bearing housing 514.

Figure 5C:
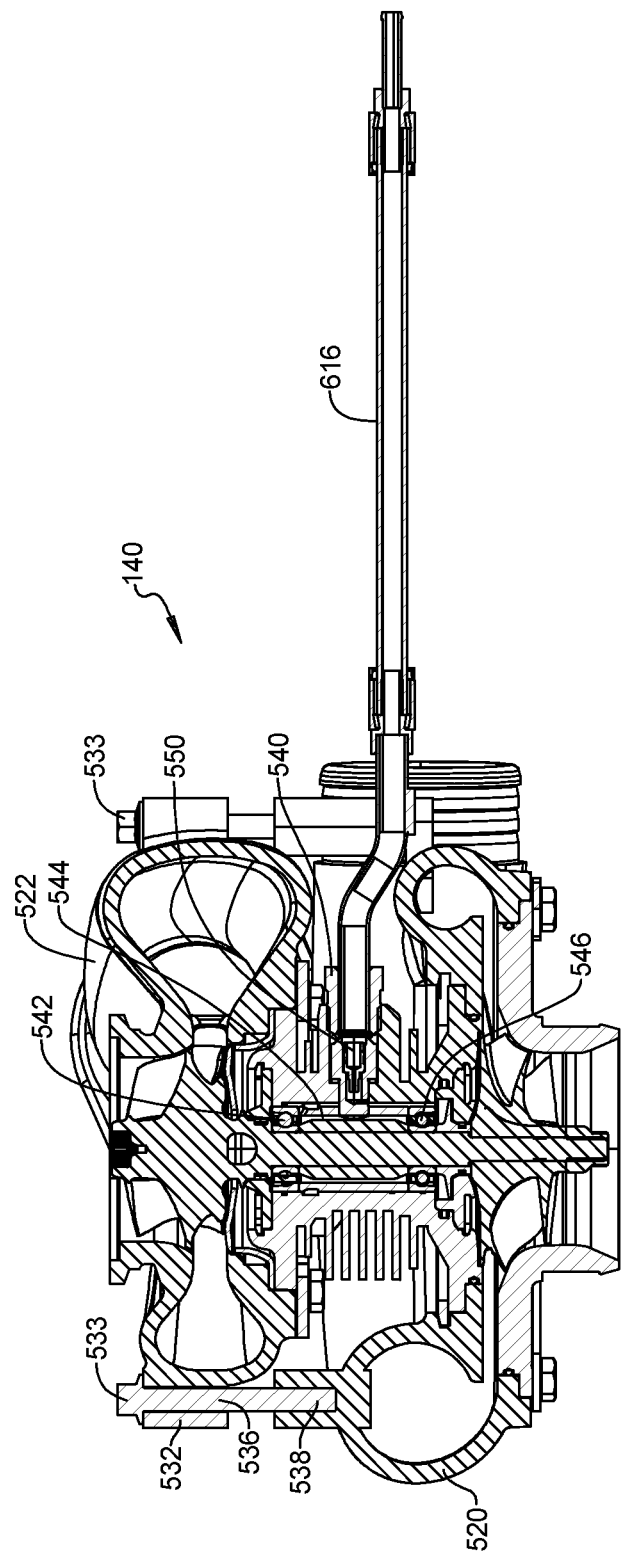

Referring now to FIG. 5C, a cross section showing a check valve 550 may be coupled to the oil inlet 540 of the turbocharger 140. The check valve 550 keeps the oil line full when oil is not flowing. Oil may not be flowing for a period of time after the oil pump begins pumping. In this manner oil starts flowing immediately and thus the life of the turbocharger 140 is extended by preventing wear and damage. The location of the check valve 550 is illustrated at the bearing housing 514. Thus, the oil may be directed through lubrication passages 544 to desired locations such as the two sets of bearings 542, 546 in the turbocharger 140. The bearings 542 are adjacent to the turbine housing. The bearings 546 are adjacent to the compressor housing.

Figure 6:
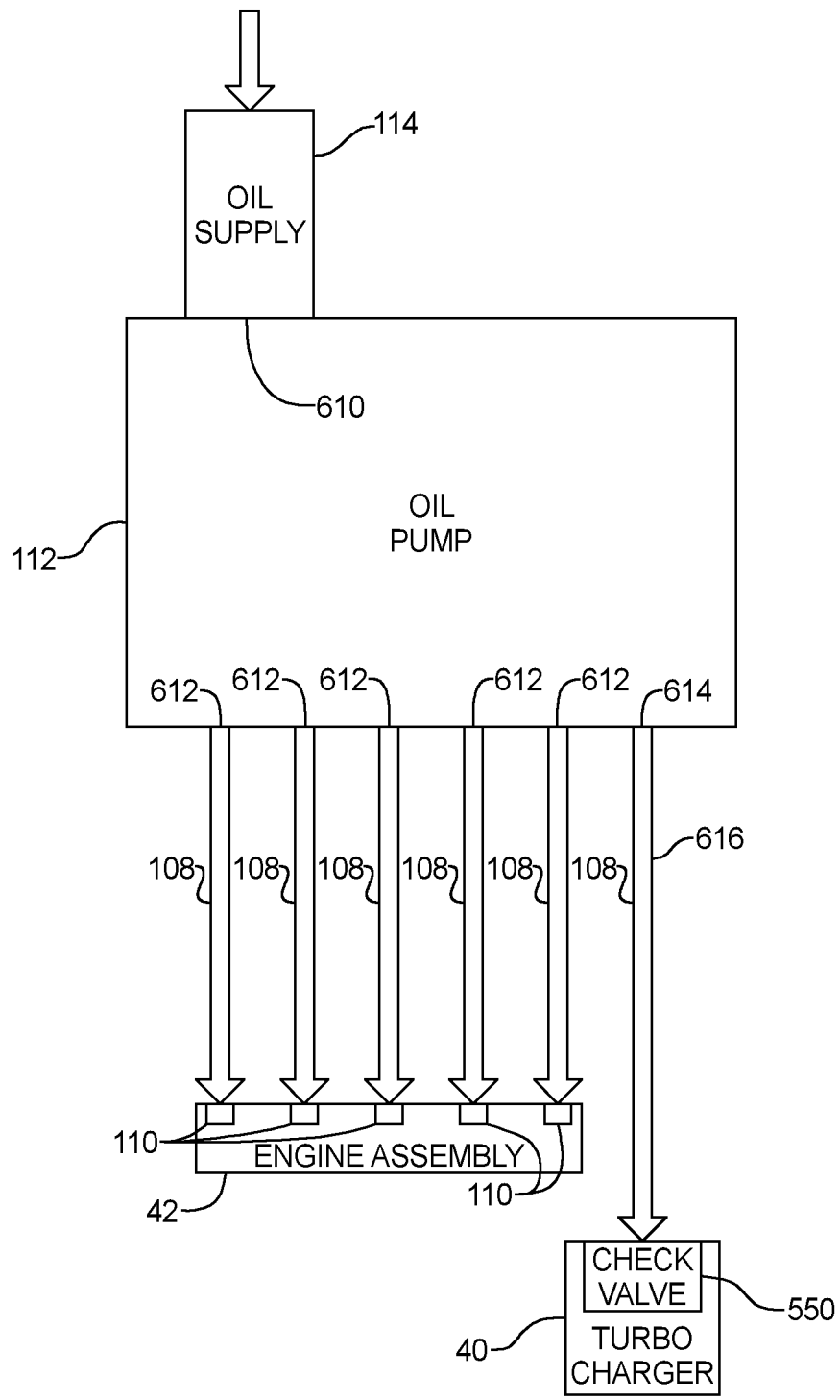

Referring now to FIG. 6, a first example of a system for supplying oil to the turbocharger 140 is set forth. In this example, the turbocharger 140 includes the check valve 550 described above. However, a check valve 550 is not required in all examples. In FIG. 6, the oil supply 114 is fluidically coupled to an inlet port 610 of the oil pump 112. The oil supply 114 may comprise a separate reservoir coupled to the engine or separate from the engine. The oil supply enters the oil pump 112 through the inlet port 610 where it is pressurized and distributed to a plurality of outlet ports 612. In this example five outlet ports 612 communicate oil to the engine assembly 40 through the oil lines 108. As mentioned above, oil injectors 110 may inject the oil from the oil lines 108 into the preferred locations of the engine assembly 40. An additional outlet port 614 may also be provided in the oil pump 112. The outlet port 614 communicates oil through a dedicated oil line 616. The check valve 550 may be sized to regulate the flow of oil into the turbocharger 140.

Referring now to FIG. 7, the oil flow requirement versus engine speed or turbo speed is set forth. As is illustrated, the engine oil demand increases linearly as the engine speed increases. The turbocharger oil demand does not increase linearly with respect to the turbo speed. The turbocharger oil demand thus is less than the engine oil demand in most locations of the plot set forth in FIG. 7. Because of the difference, the turbocharger 140 may receive excess oil if adjustments are not made.

Figure 8A:
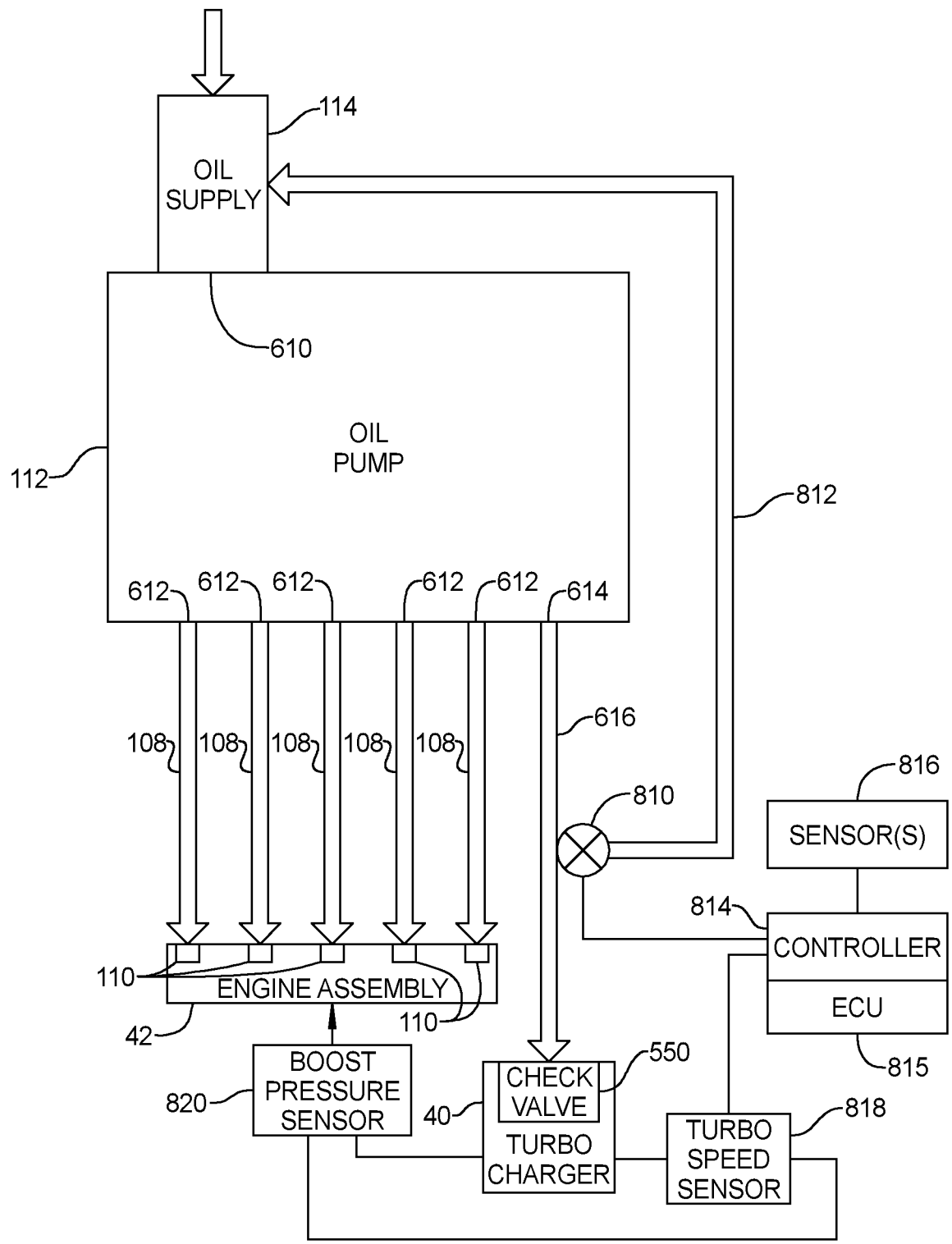

Referring now to FIG. 8A, a bypass valve 810 is disposed within the dedicated oil line 616. The bypass valve 810 couples excess oil to a bypass conduit 812. A controller 814, such as an engine control unit (ECU) or integrated into the ECU 815, is coupled to a plurality of sensors 816. The sensors 816 may include but are not limited to an engine sensor, a pressure sensor, and a temperature sensor disposed on the engine. A turbocharger speed sensor 818 disposed in the turbocharger 140 and a boost pressure sensor 820 disposed within the intake system of the engine assembly 40 may also be used. The turbocharger speed may be derived from the boost pressure, engine speed and barometric pressure. The turbocharger speed sensor is a signal corresponding to the rotational speed of the shaft extending between the turbine and compressor of the turbocharger. Based upon the signals from the sensor 816 and/or the turbocharger speed sensor 818, the controller 814 controls the opening and closing of the bypass valve 810. By controlling the bypass valve 810, the turbocharger oil demand of FIG. 7 may be achieved. In this example, the bypass conduit 812 is disposed outside of the oil pump 112. The bypass conduit 812 communicates lubricant from the dedicated oil line 616 to the oil supply 114. Of course, the bypass conduit 812 may be coupled to the inlet port 610 as well.

The controller 814 may be a microprocessor-based controller programmed to perform various steps in response to the sensed inputs from the sensor 816. In particular, the controller 814 receives a signal such as the engine speed signal from the sensors 816 and in response thereto controls the opening or closing (orifice size) of the bypass valve 810. As mentioned above the controller 814 may be incorporated into the ECU 815.

Figure 8B:
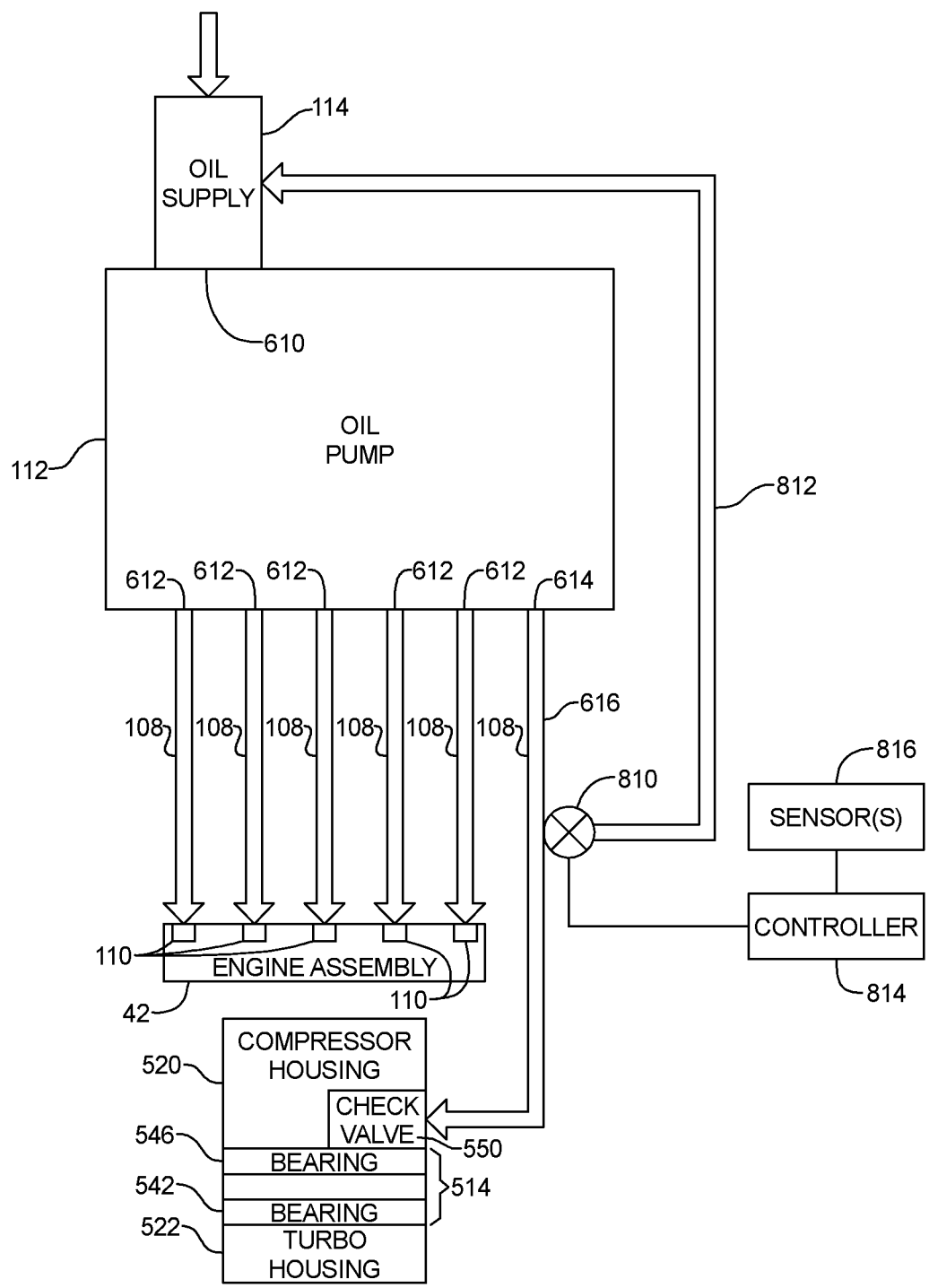

Referring now to FIG. 8B, a system similar to FIG. 8A is illustrated except the oil from the oil line 616 and the check valve 550 may be directed to the compressor housing 520. In particular, the oil may be directed to the bearing 546 or directly adjacent to the bearing 546 to cause the lubrication thereof. Because the bearing is rotating, the entire bearing 546 may be lubricated. The turbocharger 140 is vertically oriented in that the shaft is vertical so that the compressor housing 520 is over the turbine housing 522. The compressor housing has an inverted volute to form the volute closer to the bearings and turbine housing than a traditional volute which would extend upward or away from the bearings or turbine portion in a traditional turbocharger. Gravity may be used to lubricate the turbine bearing 542. Of course, both bearings 542, 546 may have oil directed thereto internally from one passage into the bearing housing 514 or externally through two separate passages.

Figure 9:
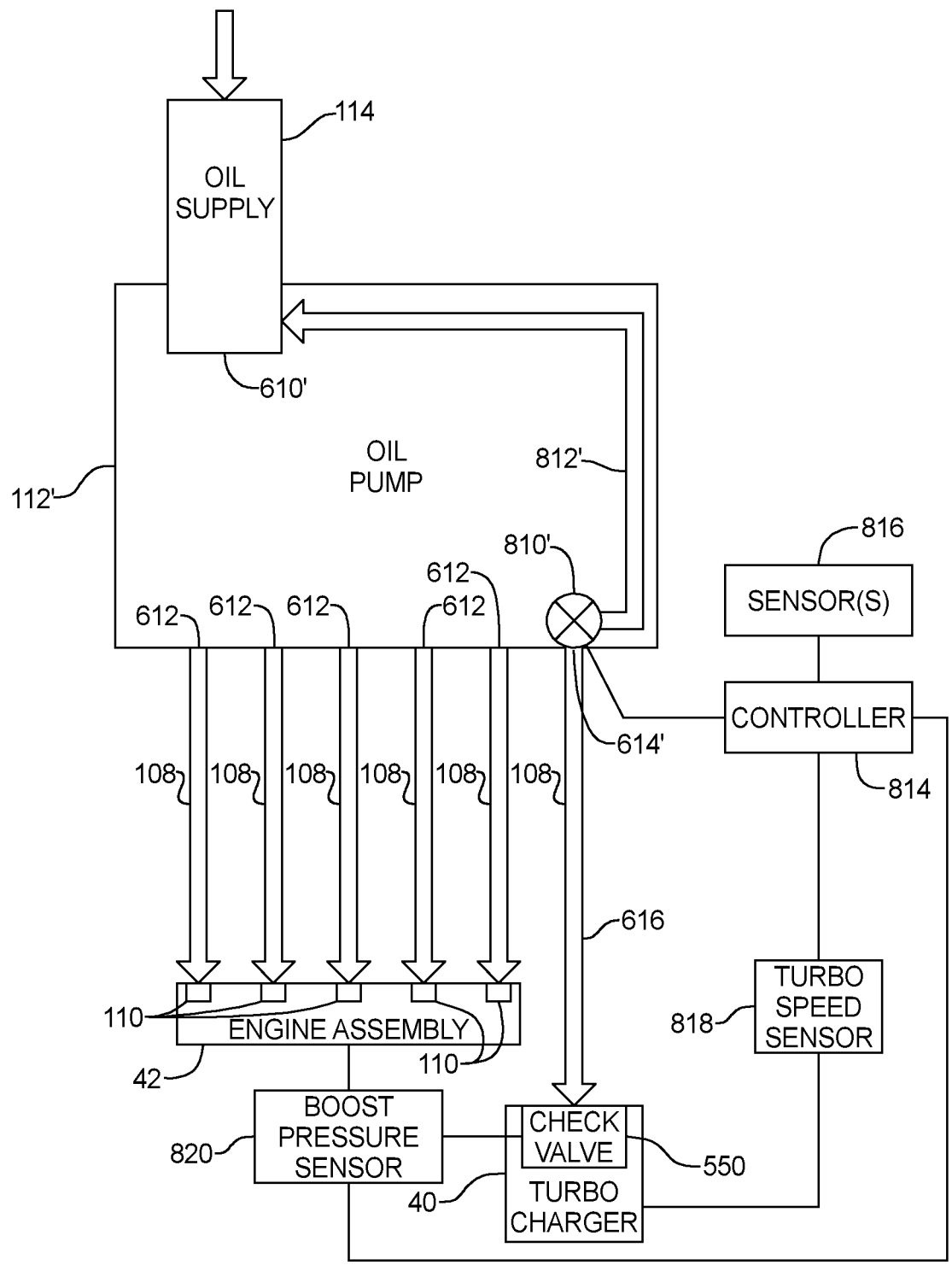

Referring now to FIG. 9, in this example the oil pump 112' has an internal bypass conduit 812' and an internal bypass valve 810'. In this example, the outlet port 614' has the bypass valve 810' located thereby. The oil to the turbocharger 140 is communicated through the bypass valve 810'. In the same manner set forth above, the controller 814 in response to the input from the sensors 816-820 controls the opening and closing of the bypass valve 810'. The lubricant in the bypass conduit 812' is communicated to the inlet port 610' and/or the oil supply 114.

Figure 10:
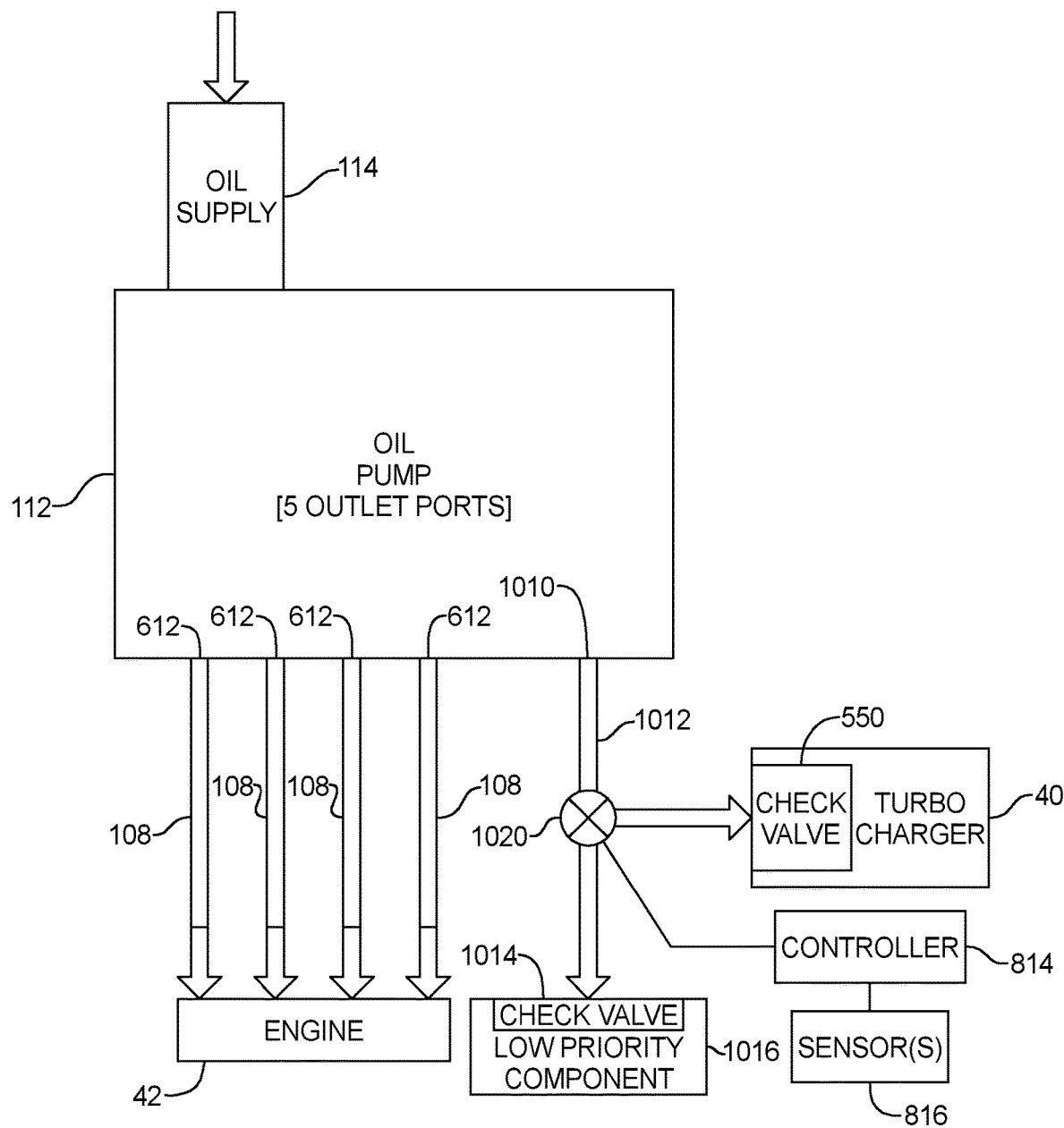

Referring now to FIG. 10, another configuration for oiling turbocharger 140 is set forth. In this example, outlet ports 612 are provided to the engine. In this example, four oiling ports are illustrated that are dedicated to different components within the engine. An oiling port 1010 is also provided that is coupled through an oil line 1012 to a check valve 1014 that is communication with a low priority component 1016. The low priority component 1016 may, for example, be a bearing. A valve 1020 selectively directs oil to either the low priority component 1016 or the turbocharger 140 under the control of the controller 814. The sensors 816 may be used to generate or determine the control. This configuration allows a single oil pump to lubricate the engine and the turbocharger. The use of a check valve 550, 1014, in the respective turbocharger 140, low priority component 1016, allows precise control and also allows a set quote "cracking" pressure and allows the oil to remain in the lines and ready for communication to the respective components. The active control of the valve 1020 allows the oil to be distributed through the oil line 1012 in the desired way.

Referring now to FIG. 11, an oil tank 1110 is illustrated coupled to the engine oil pump 112 through the oil line 108. In this example, a dedicated turbocharger oil pump 1120 communicates oil to the turbocharger 140 through the oil line 1122. The turbocharger oil pump is disposed within the oil tank 1110 and provides a single port 1124. Generally, the oil flow to the turbocharger 140 is quite a bit lower than the flow to the engine components from the engine oil pump 112. Low flow pumps are typically susceptible to air lock and therefore providing the turbocharger oil pump 1120 within the tank a lower chance of forming an air bubble is provided. That is, the turbocharger oil pump within the oil tank 1110 allows air to be purged.

Figure 11A:
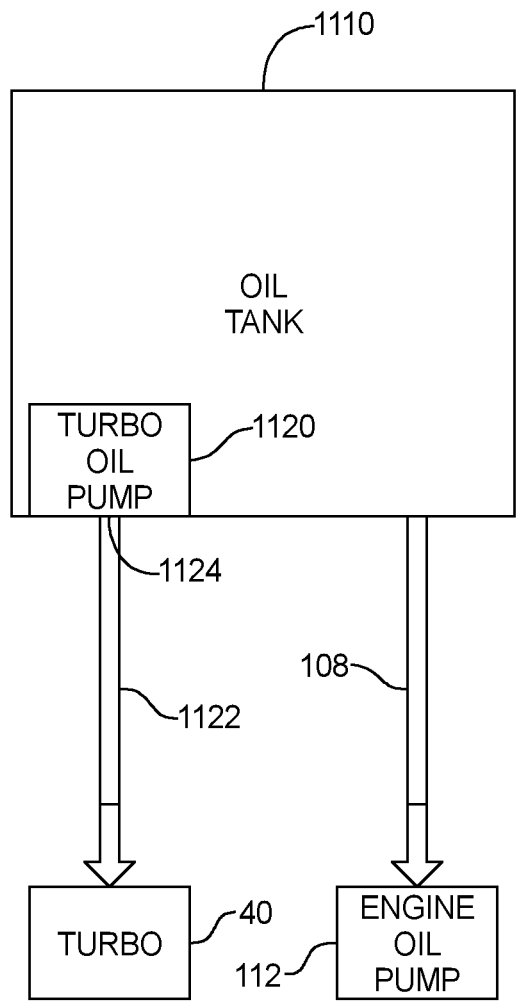
Figure 11B:
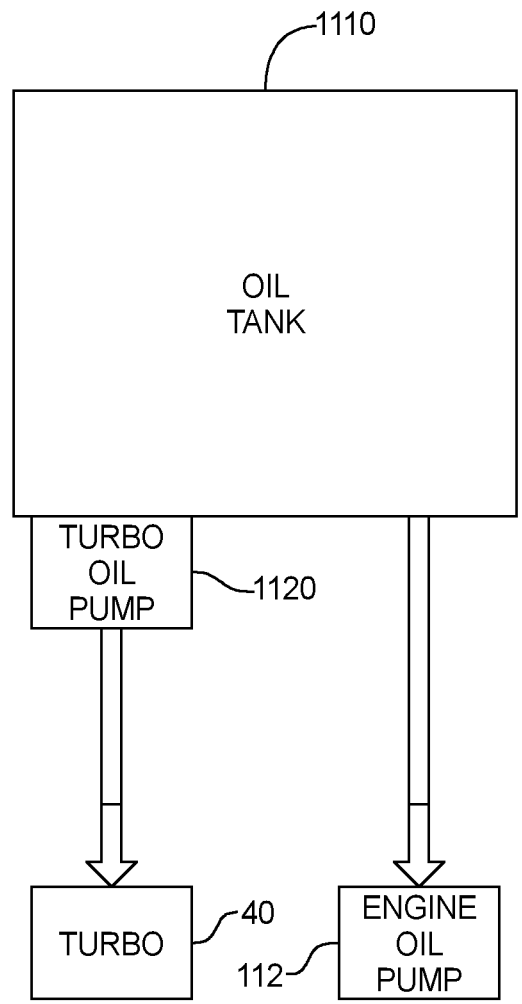
Figure 11C:
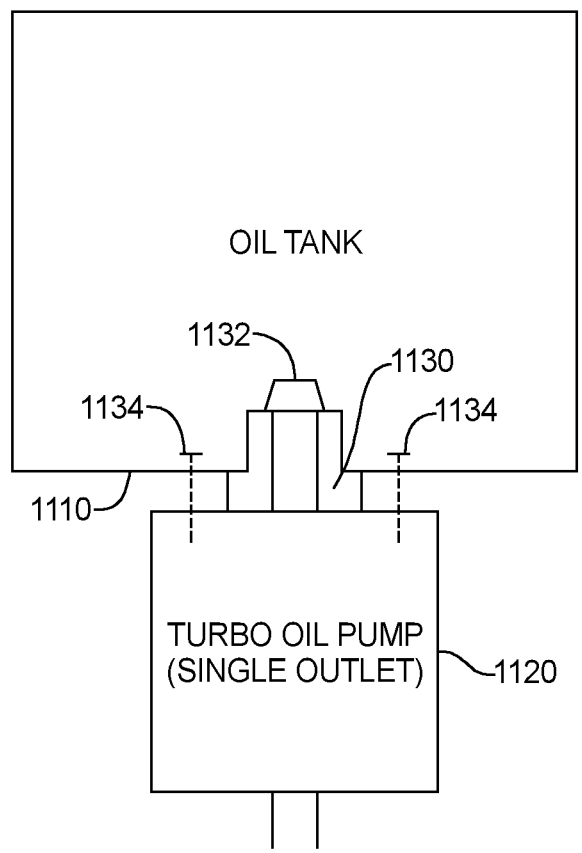
Figure 11D:
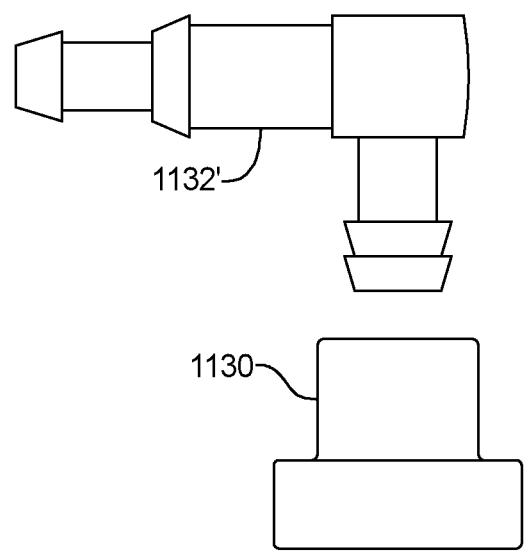

Referring now to FIGS. 11B and 11C, the oil tank 1110 may also be a separate component from the turbocharger oil pump 1120. In this example, a rubber grommet 1130 coupled to a connector 1132 may be used to communicate oil from the oil tank 1110 to the turbocharger oil pump 1120. Fasteners 1134, such as screws or bolts, may be used to mount the oil pump directly to the exterior walls of the oil tank 1110. Of course, other types of mounting systems for mounting the turbocharger oil pump 1120 to the oil tank 1110 may be provided. In FIG. 11C, the connector 1132 is straight. In FIG. 11D, the connector 1132' is at a right angle. This allows different packaging positions within the vehicle.

Figure 12A:
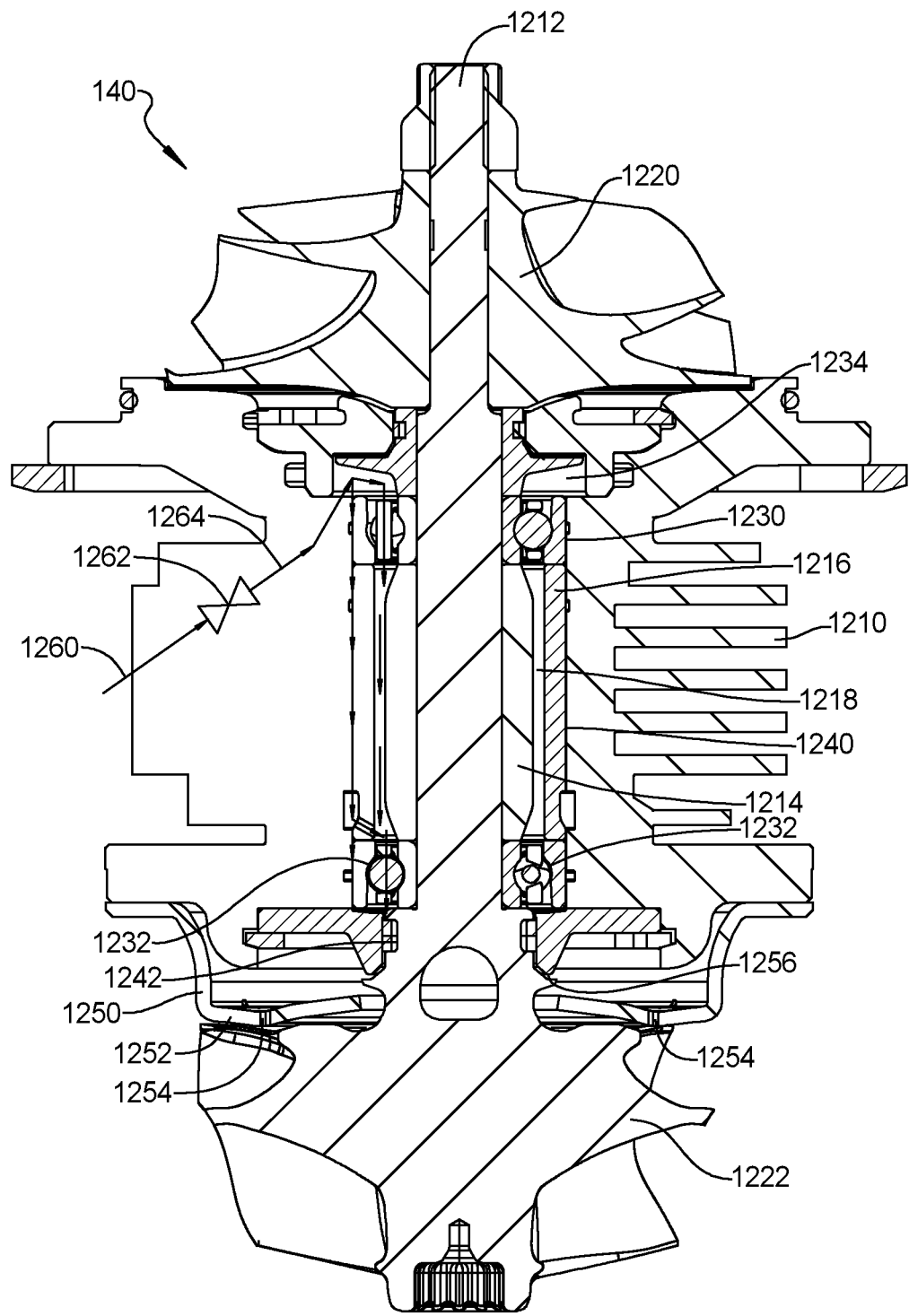
FIG. 12B is a cross-sectional view of a turbocharger having a second system for communicating oil to components within the turbocharger.
FIG. 12C is a cross-sectional view of a turbocharger having a third system for communicating oil to components within the turbocharger.
FIG. 12D is a cross-sectional view of a turbocharger having a fourth system for communicating oil to components within the turbocharger.
FIG. 12E is a cross-sectional view of a turbocharger having a fifth system for communicating oil to components within the turbocharger.
FIG. 12F is a cross-sectional view of a turbocharger having a sixth system for communicating oil to components within the turbocharger.
FIG. 12G is an enlarged view of a turbine end of a turbocharger with a heat shield therein.

Referring now to FIG. 12A, one method for oiling the components within the turbocharger 140 is set forth. The oil is provided through a returnless path. The turbocharger 140 is set forth without the compressor housing or the turbine housing for simplicity. A bearing housing 1210 is separated from the shaft 1212 by an inner spacer 1214 and an outer spacer 1216. A channel 1218 is formed between the inner spacer 1214 and the outer spacer 1216. The shaft 1212 is fixedly coupled to a compressor impeller 1220 and a turbine impeller 1222 that rotates within the respective housings which are not shown. The shaft 1212 is supported by the bearing housing 1210 through a compressor bearing 1230 and a turbine bearing 1232. The compressor bearing 1230 and the turbine bearing 1232 are longitudinally spaced apart by the inner spacer 1214 and the outer spacer 1216. A chamber 1234 is located above the compressor bearing 1230. As was mentioned before, the longitudinal axis of the shaft 1212 is positioned vertical when installed. The chamber 1234 is adjacent to and axially above the compressor bearing 1230.

A small gap between the outer spacer 1216 and the bearing housing 1210 forms a squeeze film damper 1240. As will be described in more detail below, the squeeze film damper 1240 can also act as a fluid path.

A heat shield 1250 is disposed between the turbine impeller 1222 and the turbine bearings 1232. The heat shield 1250 separates the heat from the turbine housing and the rest of the turbocharger 140. The heat shield 1250 is cup-shaped and has an annular curved portion 1252. The curved portion 1252 may have a drain hole 1254 to allow oil to drain therethrough. A radial extension 1256 extends radially outwardly from the shaft 1212 or the turbine impeller 1222. That is, the turbine impeller 1222 may have the radial extension 1256 formed therewith with the heat shield 1250 positioned between radial extension 1256 and the turbine impeller 1222. The radial extension 1256 provides a path for the oil to be deflected outwardly and onto the heat shield 1250 as will be described in more detail below. In the example of FIG. 12A, an oil feed 1260 is disposed within the bearing housing 1210. A check valve 1262 may also be disposed in or adjacent to the bearing housing 1210. An oil path 1264 from the oil feed 1260 through the check valve 1262 is in fluid communication with the chamber 1234. Oil flows in two different paths downward from the chamber 1234. That is, oils flows through the oil path 1264 into the chamber 1234. From the chamber 1234, oil flows through the squeeze film damper 1240 toward the turbine bearing 1232. Oil also flows through the compressor bearing 1230 from the chamber 1234 and through the channel 1218 toward the turbine bearing 1232. As will be described below, the amount of oil is relatively low and thus a return path to the oil reservoir is not required. However, a slight amount greater than the amount required may pass through the turbine bearing 1232 and thus excess oil flows toward the heat shield 1250 and possibly through the drain 1254. The drain 1254 may be a simple hole within the heat shield 1250. The hole may also be chemically treated with non-stick materials to increase the flow (reduce the resistance) through the drain 1254.

Figure 12B:
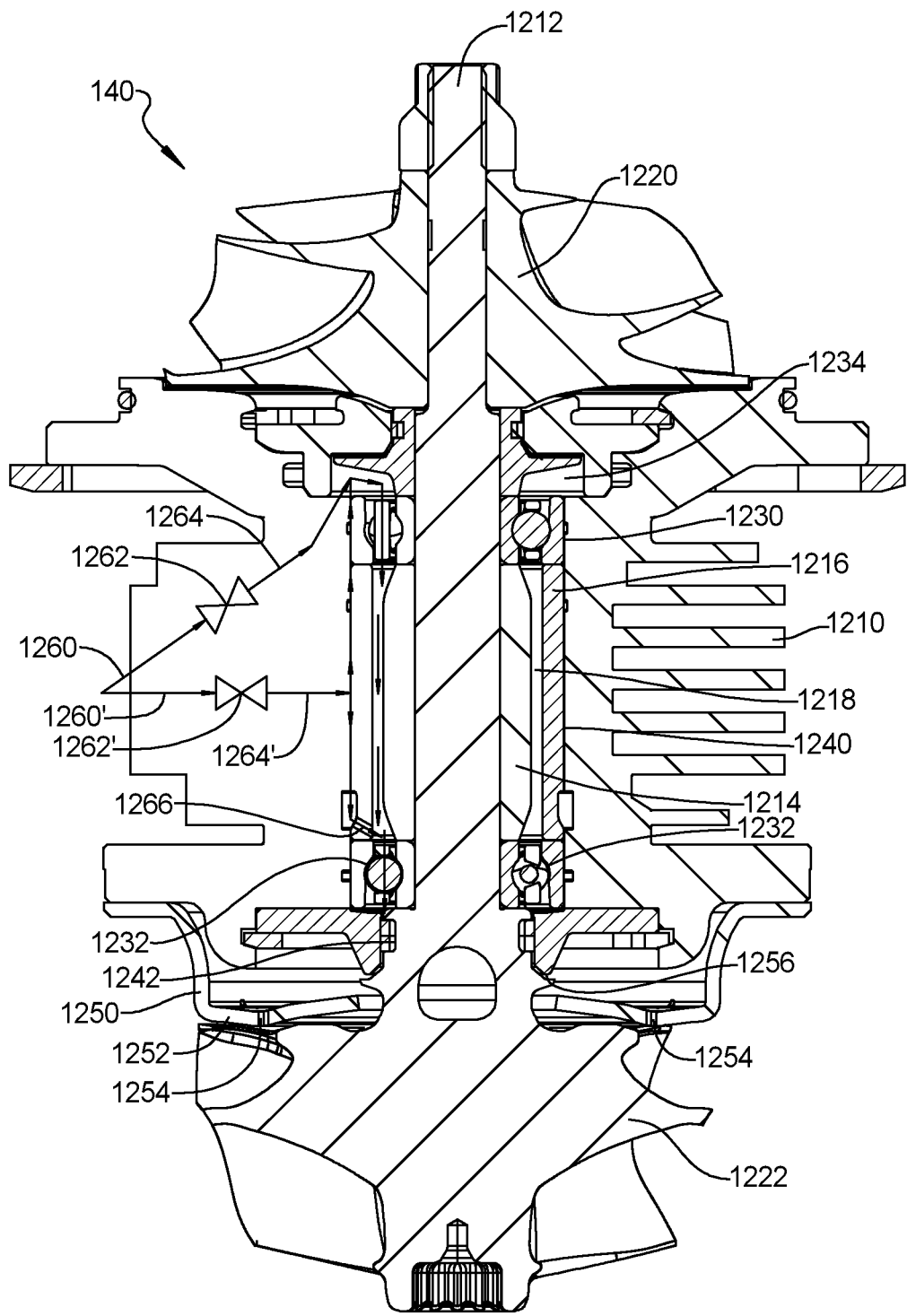

Referring now to FIG. 12B, the feed path from the check valve 1262 from the oil feed 1260 is again provided. In this example, however, a second oil feed 1260' and a second check valve 1262' may be provided. Although two separate oil feeds 1260 are shown, the same oil feed location may be used for the two separate oil paths 1264, 1264' internal to the bearing housing 1210. The oil path 1264' communicates oil to the squeeze film damper 1240. The squeeze film damper communicates fluid upward toward the chamber 1234, which, in turn, lubricates the compressor bearing 1230 from above the oil path 1264'. The squeeze film damper 1240 also communicates fluid downward through an oil path 1266 that communicates oil to the top of the turbine bearing 1232. The oil path 1266 is illustrated as an angular fluid path that extends from the squeeze film damper 1240 to an area above the turbine bearing 1232 through the outer spacer 1216. Of course, any small opening through the outer spacer to the channel 1218 between the outer spacer 1216 and inner spacer 1214 will communicate fluid to the top of the turbine bearing 1232. Thus, the oil path 1266 may be located anywhere between the oil path 1264' and the turbine bearing 1232.

Figure 12C:
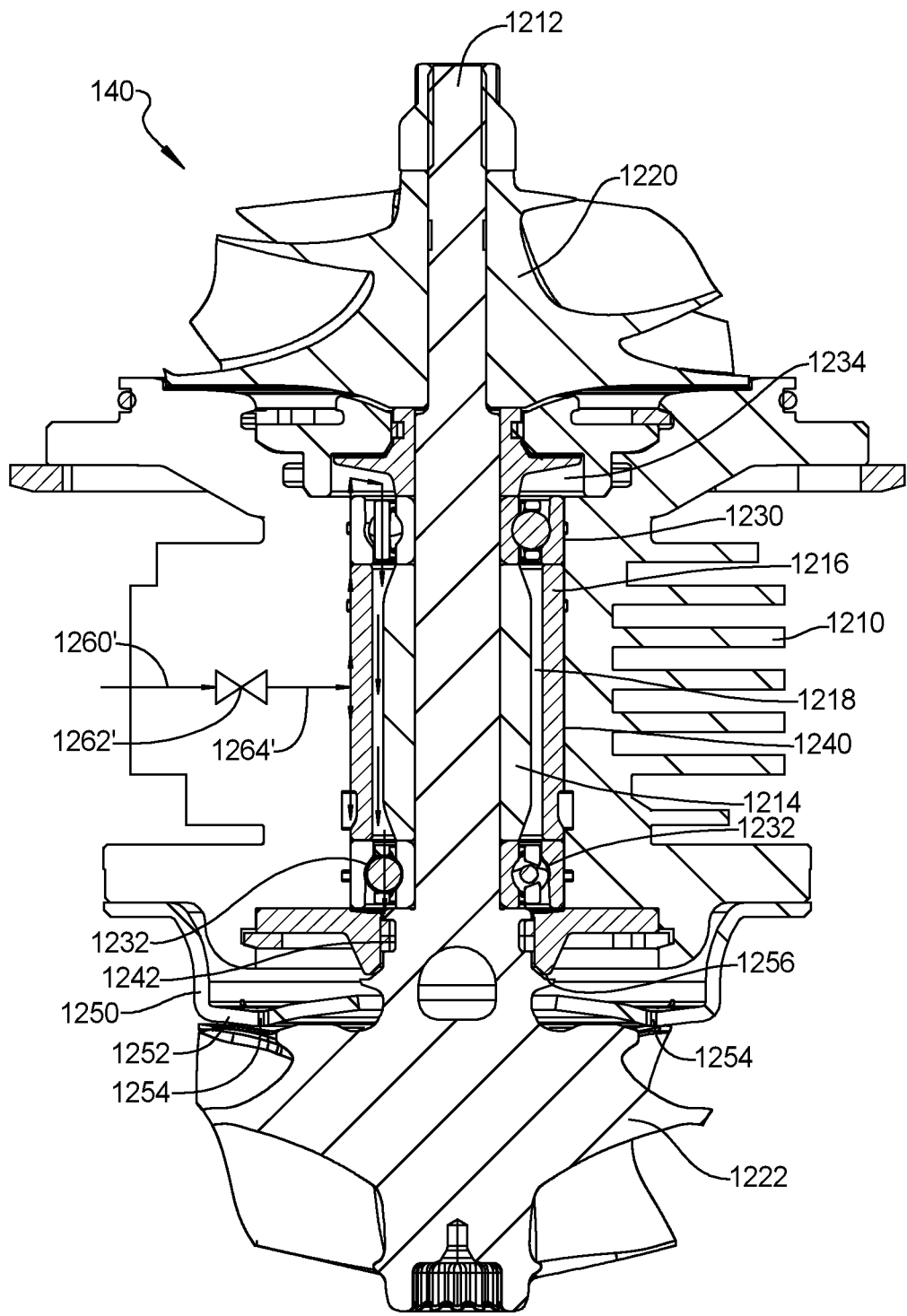

Referring now to FIG. 12C, the oil feed 1260' and check valve 1262' that are in communication with the oil path 1264' illustrated in FIG. 12B are used. In this example, the squeeze film damper 1240 is the only means of communicating oil to the chamber 1234. Fluid flows upward to the compressor bearing 1230 and then through the channel 1218 as illustrated in FIG. 12B as well. Fluid also flows downward through the oil path 1266 to the channel 1218 above the turbine bearing 1232.

Figure 12D:
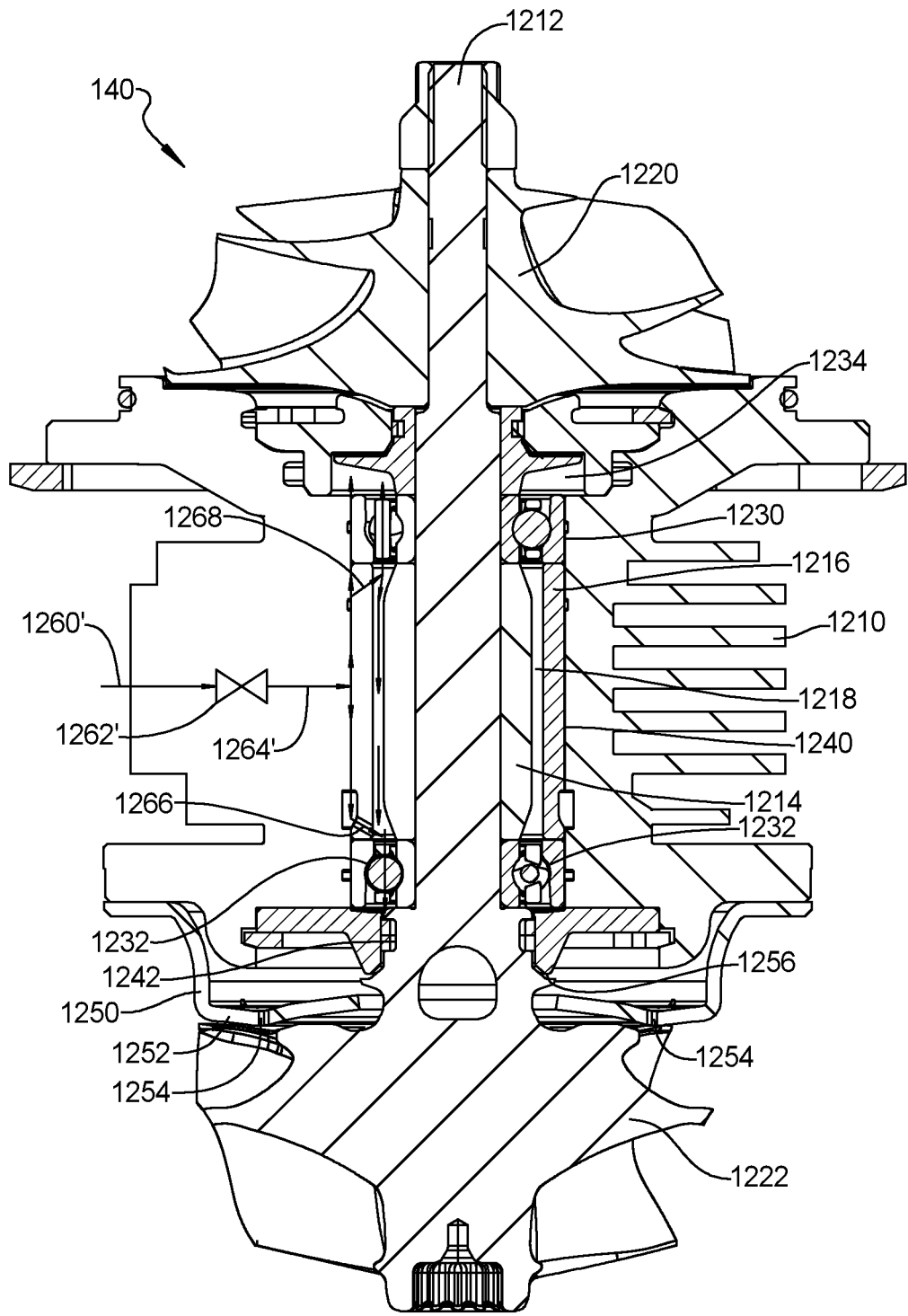

Referring now to FIG. 12D, similar fluid paths to that described above with respect to FIG. 12C are set forth except that the check valve 1262' communicates fluid upward to the underside of the compressor bearing 1230 through the oil path 1268. The oil through the oil path 1268 communicates oil upward through the compressor bearing 1230. Excess fluid travels through the channel 1218 toward the turbine bearing 1232 and through the oil path 1266.

Figure 12E:
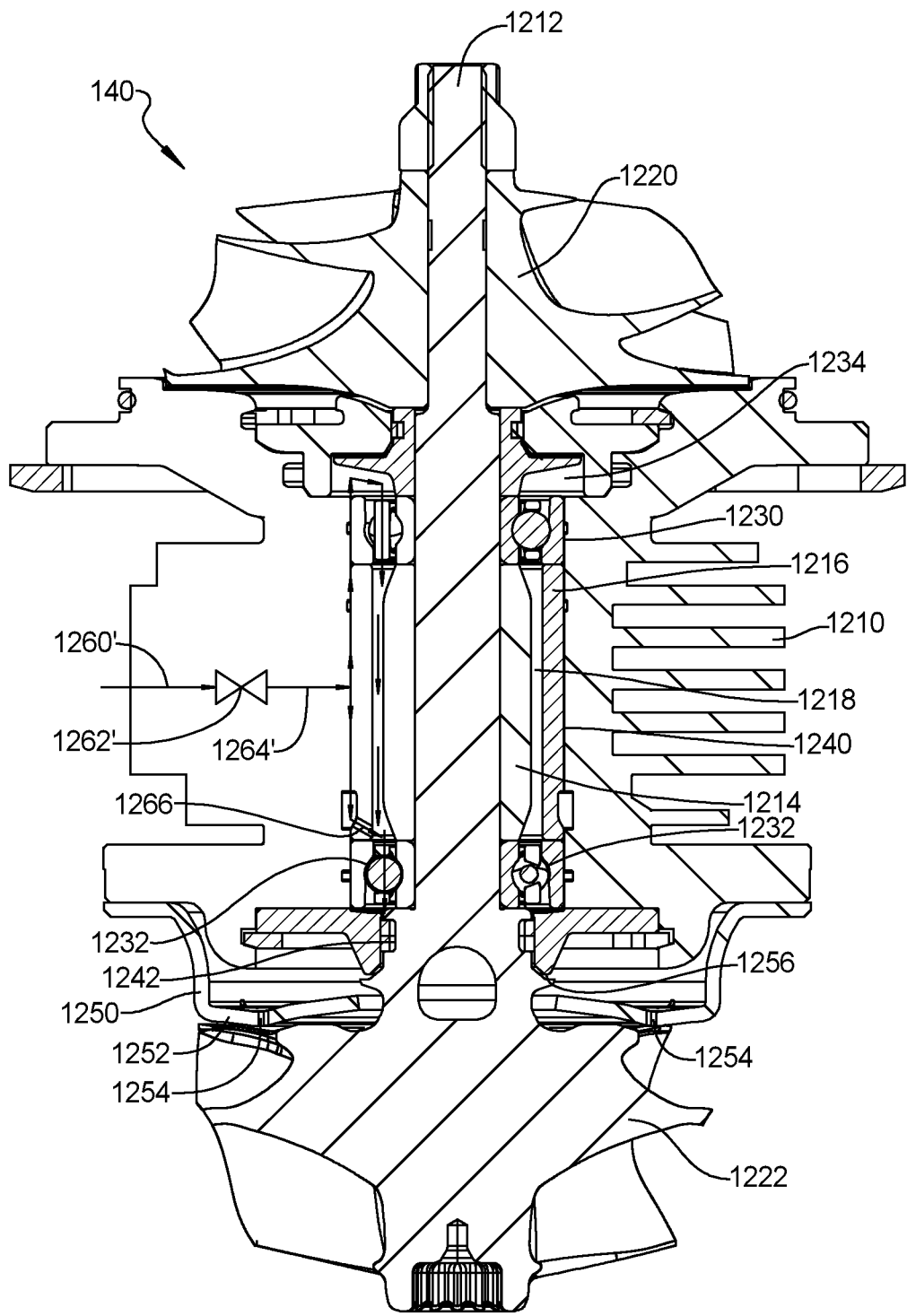

Referring now to FIG. 12E, the oil path 1264' communicates fluid from the oil feed 1260' and the check valve 1262 to the squeeze film damper 1240 which communicates fluid upward toward the chamber 1234 and downward through the compressor bearing 1230, the channel 1218 and ultimately to the turbine bearing 1232. Fluid from the oil path 1264' is also communicated downward in the squeeze film damper 1240 to the oil path 1266 which communicates oil to the turbine bearing 1232 through the channel 1218. In all cases, the oil from the turbine bearing is communicated to the turbine seal 1242. Leakage through the turbine seal 1242 is ultimately communicated downward toward the heat shield 1250.

Figure 12F:
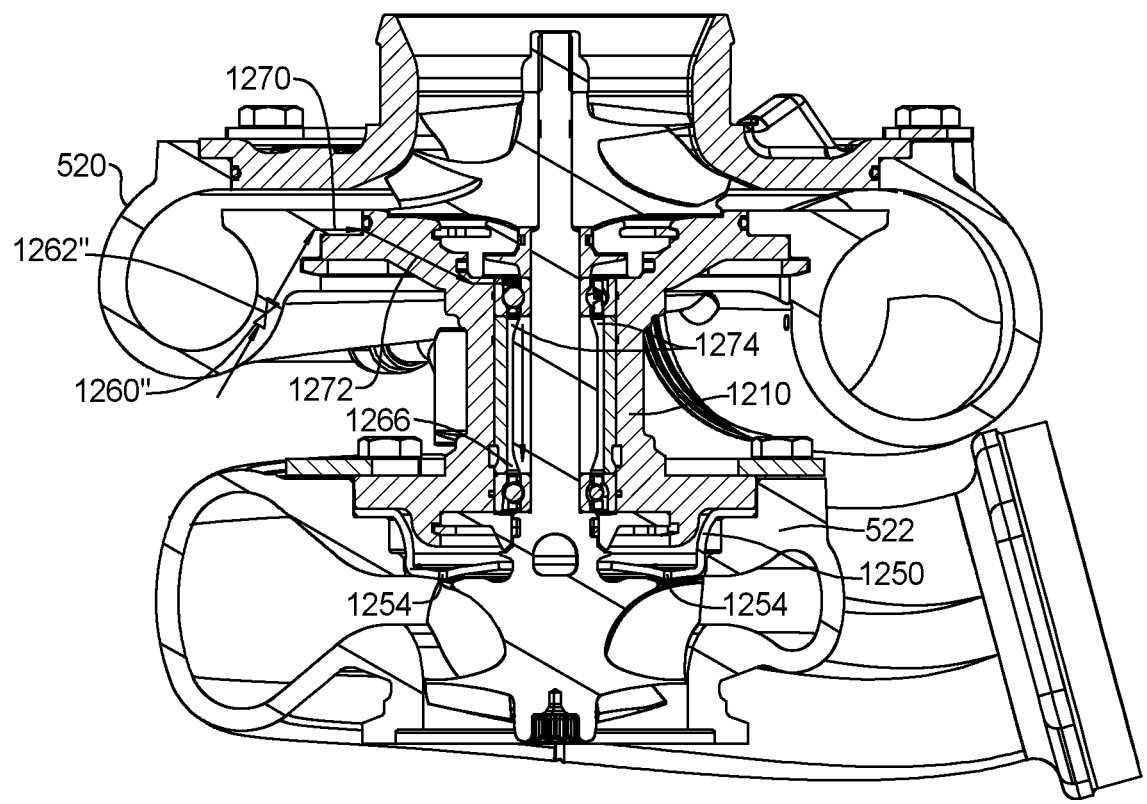

Referring now to FIG. 12F, oil feed 1260" is disposed within the compressor housing 520. In this example, the portion of the compressor housing 520 that is vertical and disposed directly adjacent to the bearing housing 1210 is set forth. Check valve 1262" communicates oil to an oil path 1270 which, in this example, is generally horizontal and communicates fluid to an oil path 1272. The oil path 1272 communicates oil to the compressor bearing 1230 and the turbine bearing 1232 through the squeeze film damper 1240. A passage 1274 communicates fluid through the compressor bearing 1230. Excess fluid communicated to the compressor bearing may flow through the channel 1218 to the turbine bearing 1232. The oil path 1266, in communication between the squeeze film damper 1240 and the channel 1218, communicates oil to the turbine bearing 1232. Of course, the configuration illustrated in FIG. 12F communicating fluid through the compressor housing may also be used to feed the other oil flow paths illustrated in FIGS. 12A-12E. In the example set forth in FIG. 12F, the oil feed is further away from the heat of the turbine portion of the turbocharger. The oil line to the oil port 1260" being further away may reduce the costs of the feed line due to lower thermal properties.

Figure 12G:
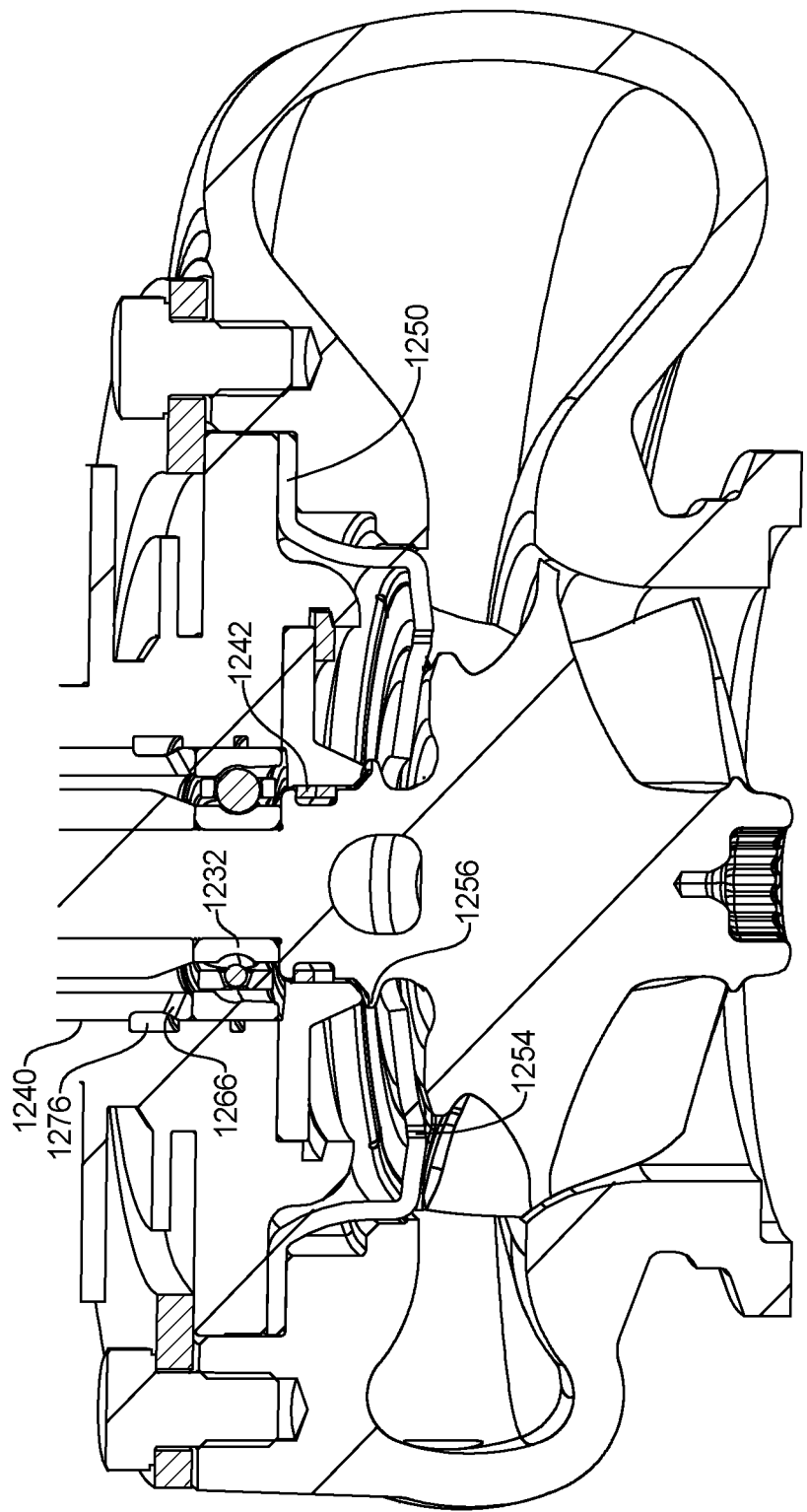

Referring now to FIG. 12G, an enlarged cross-sectional view of the turbine portion of the turbocharger 140 is set forth. The turbine bearing 1232 is illustrated relative to the oil path 1266 that communicates fluid from the squeeze film damper 1240. A reservoir 1276 which is annular in shape, may be used to collect an amount of oil prior to communicating the oil through the oil path 1266 toward the turbine bearing 1232. Oil from the turbine bearing 1232 communicates downward toward the turbine seal 1242 and toward the radial extension 1256. Oil may then be communicated to the drain 1254. The drain 1254 may be located in a low position relative to the radial extension 1256 and an upper portion of the heat shield 1250. The oil path thus travels through turbine bearing 1232 to the turbine seal 1242. A radial extension 1256 acts as an oil guide to move the oil flow axially outward toward the heat shield 1250 so the oil is communicated to the heat shield 1250 and eventually to the drain 1254.

Figure 13A:
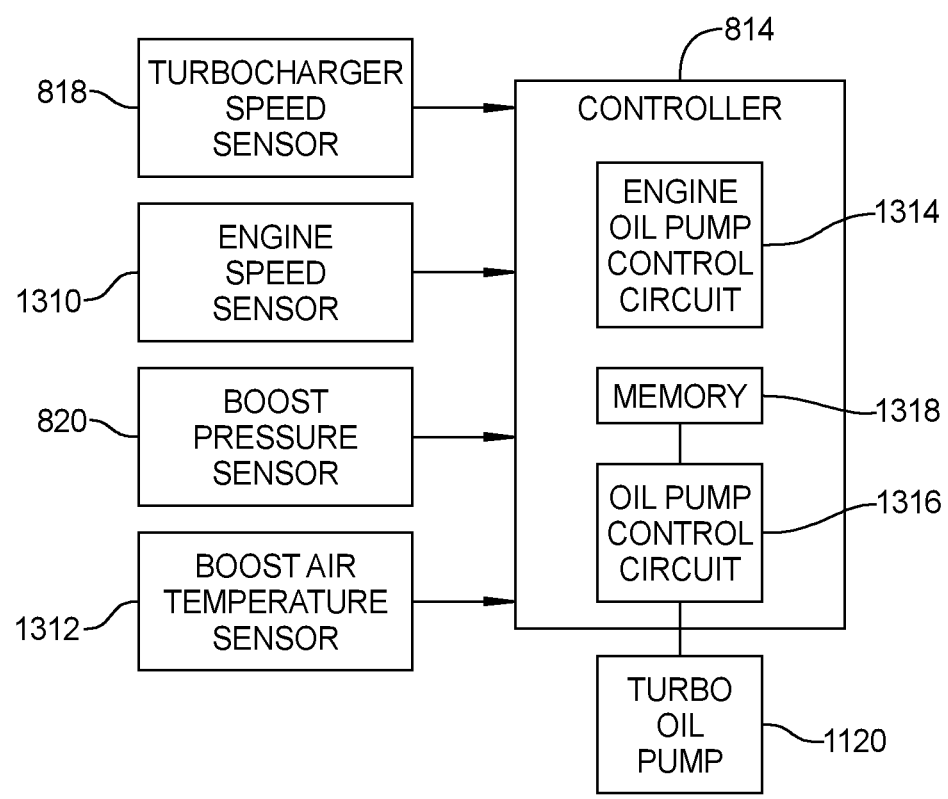
FIG. 13A is a block diagrammatic view of a system for controlling a turbocharger oil pump.

Referring now to FIG. 13A, the controller 814 described above is illustrated in further detail. The controller 814 may be coupled to a plurality of sensors that may include a turbocharger speed sensor 818, an engine speed sensor 1310, a boost pressure sensor 820 and a boost air temperature sensor 1312. Not all of the plurality of sensors may be used in a particular implementation. The turbocharger speed sensor 818, as described above, generates a speed signal corresponding to the rotational speed of the turbocharger shaft. The engine speed sensor 1310 generates a speed signal corresponding to the rotational speed of the crankshaft of the engine. The boost pressure sensor 820 provides a pressure sensor signal corresponding to the pressure at the outlet of the compressor portion of the turbocharger. A boost air temperature sensor 1312 provides a temperature corresponding to the air temperature at the outlet of the compressor. Both the boost pressure sensor 820 and the boost air temperature sensor 1312 may be integrated in a single housing and located between the engine and the turbocharger or at the turbocharger compressor outlet.

The controller 814 has an engine oil pump control circuit 1314. The engine oil pump control circuit controls the amount of oil provided to various components of the engine illustrated in FIG. 8.

A separate oil pump as illustrated in FIGS. 11A and 11B may also be provided. An oil pump control circuit 1316 controls the operation of the turbocharger oil pump 1120. A memory 1318 is used to store various calibratable values such as a base pump volume, conditioning on-time and conditioning interval times.

The conditioning on-time and interval times may be used for heating the turbocharger oil pump 1120 and to purge the turbocharger oil pump 1120 on every engine startup.

Figure 13B:
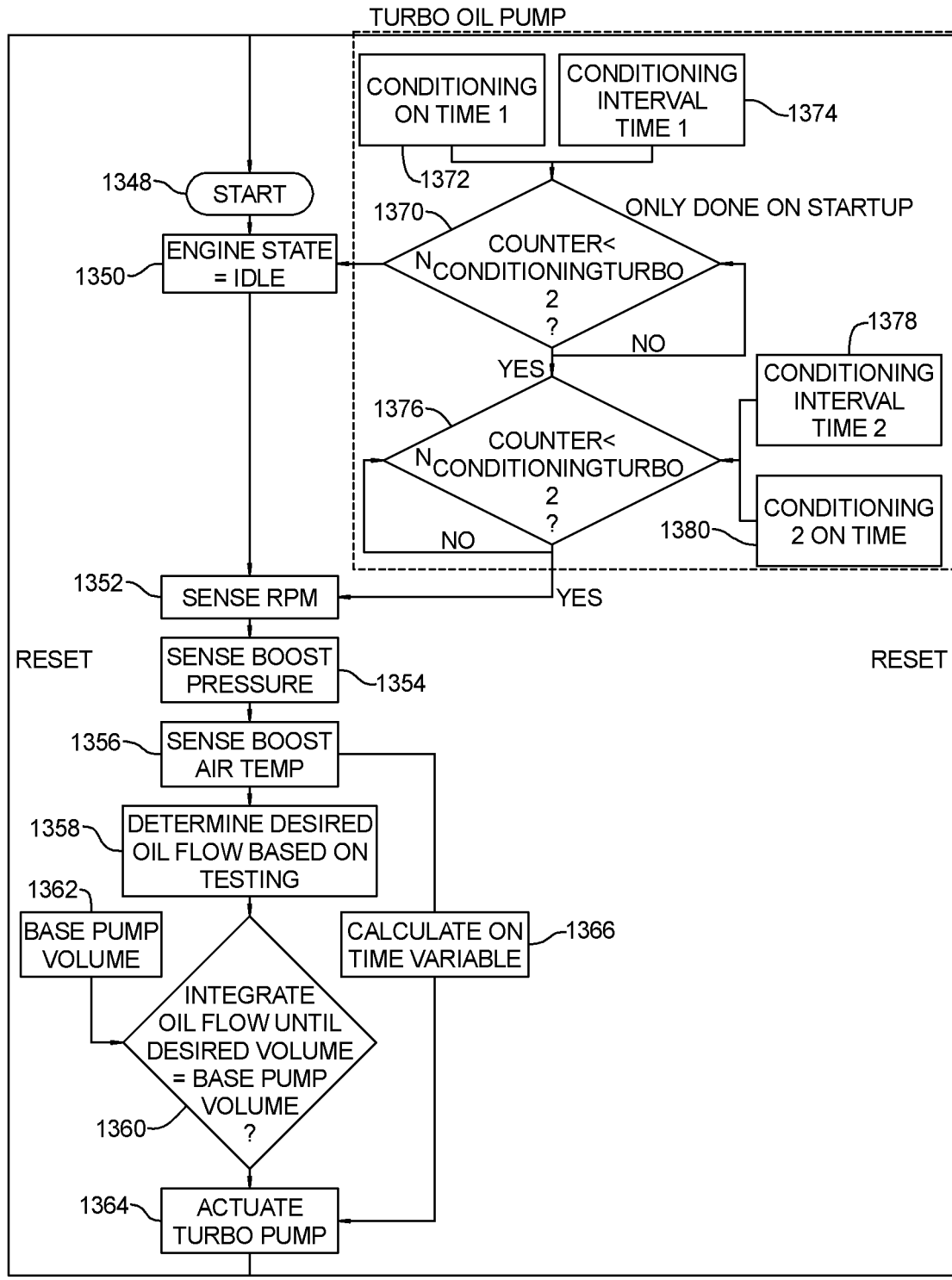
FIG. 13B is a flowchart of a method for operating a turbocharger oil pump.

Referring now to FIG. 13B, a method of operating the turbocharger oil pump is set forth. The process is started in step 1348. In step 1350, it is determined whether the engine state is at idle. When the engine is not at idle, in step 1350, step 1352 senses the engine speed. In step 1354, the boost pressure is sensed. In step 1356, the boost air temperature is sensed. In step 1358, the desired oil flow is determined. The desired oil flow may be a look-up table that is disposed within the memory 1318 which determines the desired oil flow based on the engine speed, the boost pressure and the sensed boost air temperature. The turbocharger speed may also be an alternative to the engine speed sensor and the boost pressure sensor. In step 1360, the desired oil flow is integrated in order to determine the desired volume. When the desired volume is equal to the base pump volume, in step 1362, the turbocharger oil pump is actuated in step 1364.

The sensed boost air temperature may also be used to determine the on-time of the turbocharger oil pump. The desired oil flow, and thus the volume, is constantly varied. As well, the on-time is also constantly varied. Both of the variables allow the desired amount of oil to be delivered to the turbocharger.

The pressure control strategy allows the turbocharger oil pump to run at a high frequency to provide a steadier flow of oil to the turbocharger rotating assembly without the need for a high pressure pump on the engine. The turbocharger oil flow rate may be set in the controller calibration and thus the controller actuates the oil pump to ensure no loss cycles in transient conditions as if the duty cycle and the frequency was implicitly defined.

Referring back to step 1350, when the engine is at idle, step 1370 is performed on start up. In step 1370, a conditioning on-time and conditioning interval time are provided in steps 1372 and 1374. When the counter is less than the number of conditioning cycles, step 1376 is performed. Step 1376 receives a conditioning interval time and a conditioning on-time from steps 1378 and 1380. Step 1376 allows the pump to be purged of turbocharger oil. By performing the warm up and the conditioning, the first commanded actuations of oil to the turbocharger are more accurate.

Referring now to FIG. 14A, a prior art design of a turbocharger 140 has the turbine impeller 1222 and turbine housing 522. The turbine housing 522 has a turbine housing diffuser 1410. The turbine housing diffuser 1410 has a flange 1412. A silencer or muffler 1414 also has a flange 1416 that allows the muffler 1414 to be coupled to the turbine housing diffuser 1410 with a V-band joint 1420. One problem for snowmobiles and various other types of vehicles is that package space is typically limited. Providing the muffler with a coupling on the exterior to the turbine housing diffuser provides a very long passage in the longitudinal direction of the turbocharger.

Figure 14C:
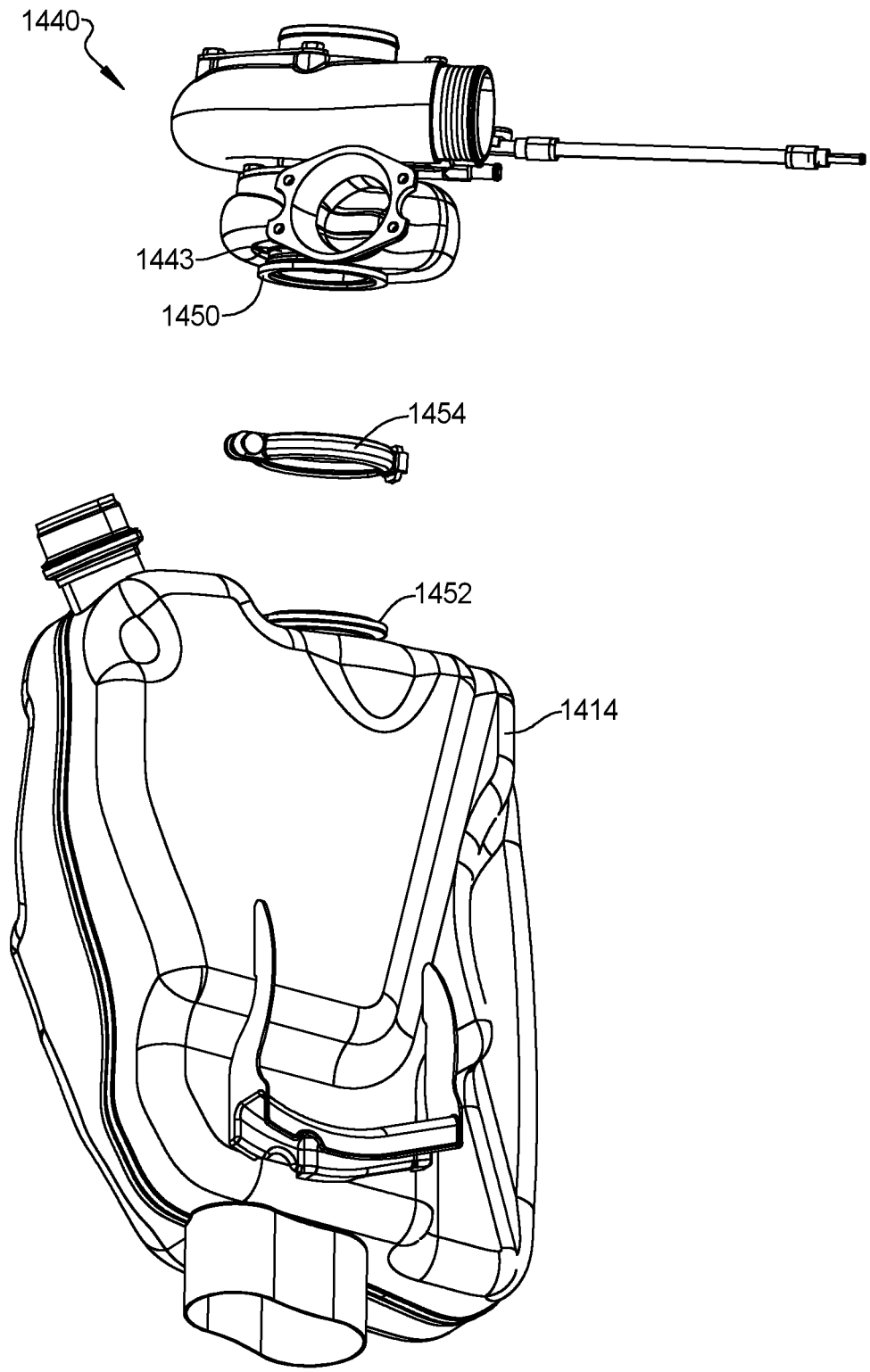
FIG. 14C is an exploded view of a turbocharger relative to a muffler according to the present disclosure.

Referring now FIGS. 14B and 14C, an improved configuration for a turbocharger and muffler assembly is set forth. In this example, a turbocharger 1440 has a housing 1442. The turbine housing 1442 does not include turbine housing diffuser 1410 integrated therein as illustrated in FIG. 14A. In this example, a muffler 1444 has an integrated diffuser 1446 coupled thereto. The turbine impeller portion of the housing 1442 is coupled to the integrated diffuser 1446 with respective flanges 1450, 1452. A V-band clamp 1454 may also be used to couple the flanges 1450, 1452 together.

The integrated diffuser 1446 has a conical shaped wall 1460 that partially extends within the outer wall 1462 of the muffler 1444 at a first end 1460A and outside the outer wall 1462 at a second end 1460B of the muffler 1444. The ends 1460A and 1460B are at opposite longitudinal ends of the conical shaped wall 1460. Thus, the diffuser 1446 is partly external to the interior of the muffler 1444. The exterior wall 1462 may be an end wall of the longitudinal shaped muffler 1444 that is closest to the turbocharger 1440.

Figure 15A:
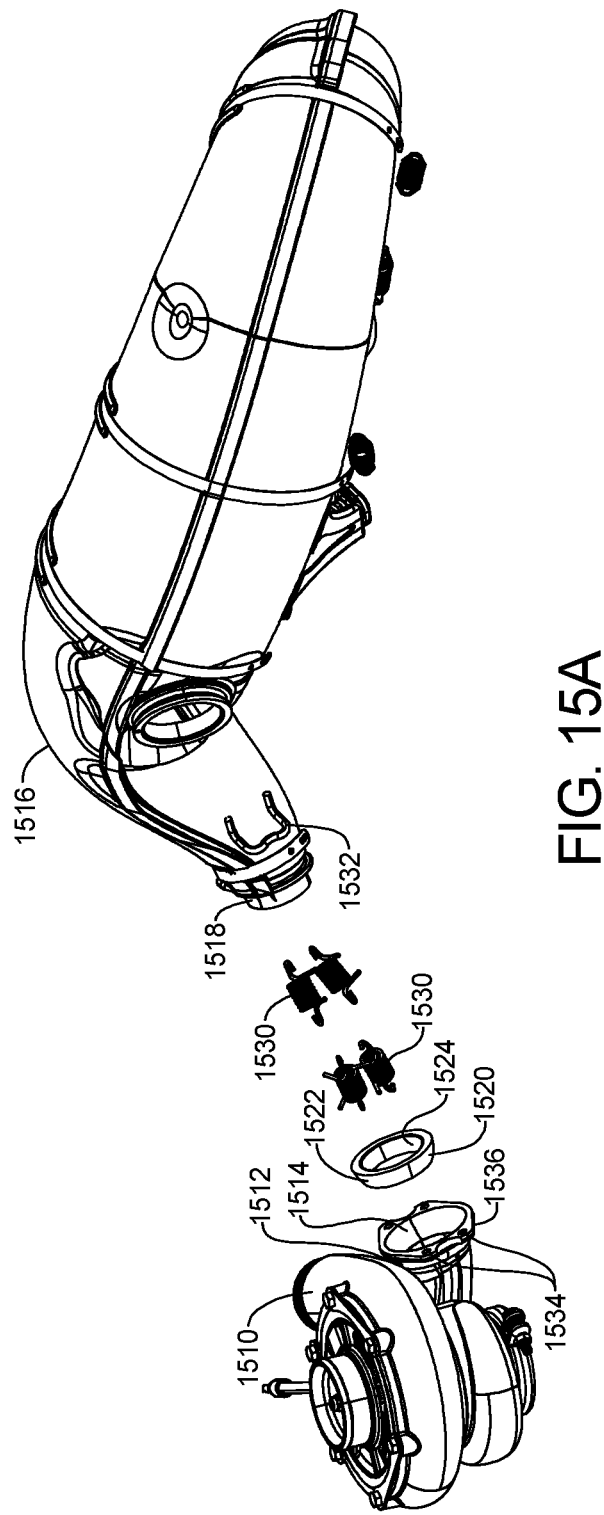
FIG. 15A is an exploded view of a mounting system for an inlet of a turbocharger.
Figure 15B:
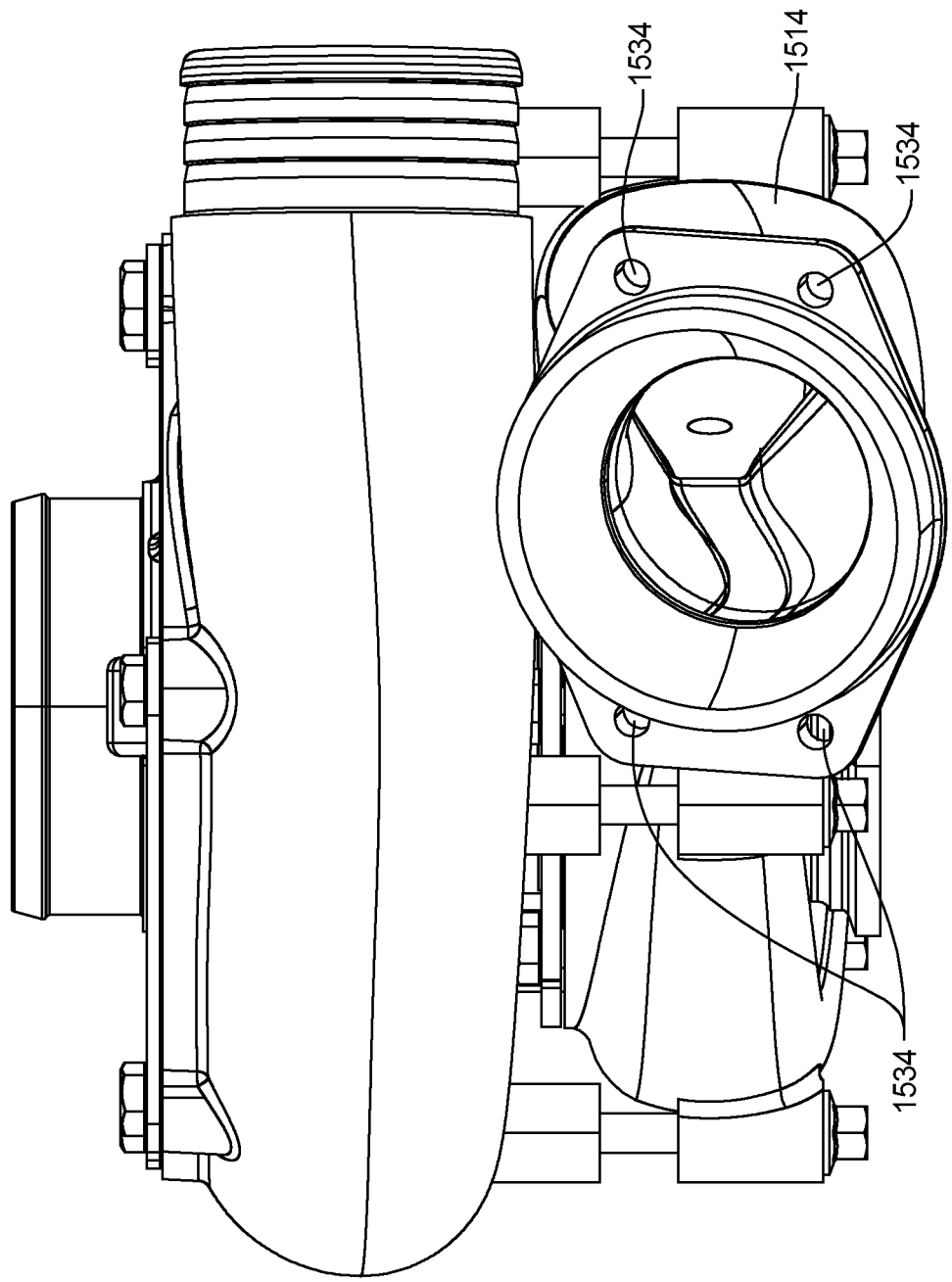
FIG. 15B is a side view of the inlet of the turbine portion of the turbocharger.

Referring now to FIGS. 15A and 15B, a modified turbocharger 1510 has a turbine inlet 1512. The turbine inlet 1512 has a donut-shaped or rounded socket 1514. The rounded socket 1514 is used to receive an exhaust component such as tuned pipe 1516. The tuned pipe 1516 has a flange 1518 that is used to receive a ring 1520. The ring 1520 has a rounded wall or external surface 1522. In one constructed configuration, the external surface 1522 is a band of a sphere. The band of the sphere 1522 fits within the rounded socket 1514. The flange 1518 is shaped to be received within inner wall 1524 of the ring 1520.

To urge the flange into the rounded socket 1514, springs 1530 are coupled to spring couplers 1532 on the tuned pipe 1516. The springs 1530 have a first end coupled to the spring couplers 1532 and a second end coupled to openings 1534 of a flange 1536 of the inlet 1512. The external surface 1522 of the ring 1520 allows easier alignment during assembly to take up manufacturing variances. The rounded external surface 1522 also allows for relative movement of the components during operation. All of the components may be formed from metal. However, the ring 1520 may also be formed of a thermoplastic or the like.

The donut-shaped or rounded socket 1514 is the female side of an exhaust sealing joint using a spherical graphal donut. The donut or rounded flange is a thin flange integrated to the outside of the turbine housing. The spherical graphal donut slides over the tuned pipe outlet so the outside wall of the tuned pipe is adjacent to the inside surface of the donut, with the flat face of the donut contacting the stop flange. In an exhaust joint with a spherical graphal donut springs are used to hold the joint together. Spring hooks or couplers 1532 may be used on both mating components to hold the system together. The spring hooks are integrated into the turbine housing to hold the two components together. The advantage of this is it simplifies the design. Less components are needed because the donut socket or flange does not need to be a separate piece that is fastened to the turbine housing. This is also true for the spring hooks or couplers. That is, they do not need to be separate pieces welded to the turbine housing. This decreases the overall number of components, the cost, and the weight of the design.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A system comprising:
an oil supply of oil disposed in an oil tank;
an engine oil pump disposed outside the oil tank dedicated to communicating the oil from the oil supply to the engine, said engine oil pump comprising a plurality of ports;
an engine coupled to the plurality of ports, said engine separate from the oil tank;
a turbocharger coupled to the engine; and
a turbocharger oil pump separate from the engine oil pump dedicated to communicating the oil in the oil tank to the turbocharger, said turbocharger oil pump submerged within the oil tank and coupled to the oil supply, said turbocharger oil pump comprising a first port communicating the oil from the oil supply to the turbocharger.

2. The system of claim 1 further comprising a controller controlling the turbocharger oil pump in response to an engine speed signal.

3. The system of claim 1 further comprising a controller coupled to a turbocharger boost pressure sensor generating a boost pressure signal, said controller controlling the turbocharger oil pump in response to the boost pressure signal.

4. The system of claim 1 further comprising a controller coupled to a turbocharger boost pressure sensor generating a boost pressure signal and an engine speed sensor generating an engine speed signal, said controller controlling the turbocharger oil pump in response to the boost pressure signal, and the engine speed signal.

5. The system of claim 1 further comprising a controller coupled to a turbocharger boost pressure sensor generating a boost pressure signal, an engine speed sensor generating an engine speed signal and a boost air temperature generating a boost air temperature signal, said controller controlling the turbocharger oil pump in response to the boost pressure signal, the boost air temperature signal and the engine speed signal.

6. The system of claim 5 wherein the controller determines an on time and a desired oil flow rate from the boost pressure signal, the engine speed signal and the boost air temperature signal.

7. The system of claim 1 wherein the first port is coupled to the turbocharger through a check valve.

8. The system of claim 7 wherein the check valve is disposed within a compressor housing of the turbocharger.

9. The system of claim 7 wherein the check valve is disposed at a bearing housing of the turbocharger.

10. The system of claim 1 wherein the turbocharger comprises a compressor housing, a turbine housing, and a bearing housing, said compressor housing comprising a first plurality of fastener receivers, said turbine housing comprising a second plurality of fastener receivers, and a plurality of fasteners directly respectively coupling the first plurality of fastener receivers directly with the second plurality of fastener receivers.

11. A system comprising:
an oil supply;
an engine oil pump comprising a plurality of ports;
an engine coupled to the plurality of ports;
a turbocharger coupled to the engine;
a turbocharger oil pump coupled to the oil supply comprising a first port coupled to the turbocharger; and
a controller coupled to a turbocharger boost pressure sensor generating a boost pressure signal, an engine speed sensor generating an engine speed signal and a boost air temperature generating a boost air temperature signal, said controller controlling the turbocharger oil pump in response to the boost pressure signal, the boost air temperature signal and the engine speed signal,
the controller determining an on time and a desired oil flow rate from the boost pressure signal, the engine speed signal and the boost air temperature signal;
the controller integrating the desired oil flow rate to determine a desired volume and controls the turbocharger oil pump in response to comparing the desired volume to a base volume.

12. A method of operating a turbocharger comprising:
communicating oil from an oil tank having an oil supply of oil to an engine from an engine oil pump located outside the oil tank dedicated to communicating the oil from the oil supply to the engine, said engine separate from the oil tank;
communicating oil from a turbocharger oil pump submerged within the oil tank of the oil supply, said turbocharger oil pump separate from the engine oil pump and dedicated to communicating the oil in the oil tank to the turbocharger; and
communicating oil to the turbocharger from the oil supply through a first port of the turbocharger oil pump.

13. The method of claim 12 further comprising controlling the turbocharger oil pump in response to engine speed or boost pressure, or both.

14. The method of claim 12 wherein communicating oil to the turbocharger comprises communicating oil to a bearing housing of the turbocharger through a check valve.

15. The method of claim 14 wherein communicating oil to the turbocharger comprises communicating oil to the bearing housing of the turbocharger through the check valve disposed within the bearing housing.

16. The method of claim 12 wherein communicating oil to the turbocharger comprises communicating oil to a compressor housing of the turbocharger.

17. The method of claim 12 further comprising generating a boost pressure signal and controlling the turbocharger oil pump in response to the boost pressure signal.

18. The method of claim 12 further comprising generating a boost pressure signal, generating an engine speed signal and generating a boost air temperature signal, controlling the turbocharger oil pump in response to the boost pressure signal, the boost air temperature signal and the engine speed signal.

19. The method of claim 12 further comprising generating a boost pressure signal, generating an engine speed signal and controlling the turbocharger oil pump in response to the boost pressure signal, and the engine speed signal.

20. The method of claim 19 further comprising determining an on time for turbocharger oil pump and a desired oil flow rate from the boost pressure signal and the engine speed signal.

21. A method of operating a turbocharger comprising:
communicating oil from an oil supply to an engine from an engine oil pump;
communicating oil from the oil supply to a turbocharger oil pump, said turbocharger oil pump separate from the engine oil pump; and
communicating oil to the turbocharger through a first port of the turbocharger oil pump;
generating a boost pressure signal;

generating an engine speed signal;

controlling the turbocharger oil pump in response to the boost pressure signal, and the engine speed signal;

determining an on time for turbocharger oil pump and a desired oil flow rate from the boost pressure signal and the engine speed signal; and integrating the desired oil flow rate to determine a desired volume and controlling the turbocharger oil pump in response to comparing the desired volume to a base volume.

22. A turbocharger comprising:

a turbocharger housing comprising a compressor housing, a turbine housing, and a bearing portion disposed between the turbine housing and the compressor housing, said turbocharger housing comprising a shaft having a vertical axis of rotation, said compressor housing disposed above the turbine housing;

a compressor bearing disposed between the shaft and the bearing housing;

an inner bearing spacer and an outer bearing spacer;

a turbine bearing disposed between the shaft and the bearing housing;

a squeeze film damper disposed between the bearing housing and the outer bearing spacer;

an oil feed disposed within the turbocharger housing; and oil path fluidically coupled to the oil feed communicating oil to the compressor housing, the turbine bearing and the squeeze film damper, said oil path fluidically coupled oil from the compressor bearing to the turbine bearing.

23. The turbocharger recited in claim 22 wherein the oil feed is disposed through the compressor housing.

24. The turbocharger of claim 23 further comprising a check valve coupled to the compressor housing.

25. The turbocharger recited in claim 22 wherein the oil feed is disposed through the bearing housing.

26. The turbocharger recited in claim 25 further comprising a check valve coupled to the bearing housing.

27. The turbocharger recited in claim 25 wherein a first portion of the oil path is disposed through the bearing housing from the oil feed to a first chamber above the compressor bearing.

28. The turbocharger recited in claim 27 wherein a second portion of the oil path is disposed through the bearing housing to the squeeze film damper.

29. The turbocharger recited in claim 25 wherein a first portion of the oil path is disposed through the bearing housing from the oil feed to the squeeze film damper and a second portion of the oil path is disposed from the squeeze film damper to a first chamber above the compressor bearing and a third portion of the oil path extends from the squeeze film damper to the turbine bearing.

30. The turbocharger recited in claim 22 wherein a first portion of the oil path is disposed through the bearing housing from the oil feed to the squeeze film damper and a second portion of the oil path is disposed from the squeeze film damper to below the compressor bearing and a third portion of the oil path extends from the squeeze film damper to the turbine bearing.

31. The turbocharger recited in claim 22 further comprising a heat shield disposed between the turbine bearing and a turbine impeller, said heat shield comprising an opening draining oil toward the turbine impeller.

32. The turbocharger recited in claim 31 wherein the turbine impeller comprises a radial extension directing oil from the bearing axially outward toward the heat shield.

* * * * *